United States Patent
Lys et al.

(10) Patent No.: US 7,352,138 B2
(45) Date of Patent: *Apr. 1, 2008

(54) METHODS AND APPARATUS FOR PROVIDING POWER TO LIGHTING DEVICES

(75) Inventors: Ihor A. Lys, Milton, MA (US); Kevin J. Dowling, Westford, MA (US); Frederick M. Morgan, Quincy, MA (US)

(73) Assignee: Philips Solid-State Lighting Solutions, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/379,191

(22) Filed: Apr. 18, 2006

(65) Prior Publication Data

US 2006/0208667 A1 Sep. 21, 2006

Related U.S. Application Data

(63) Continuation of application No. 10/435,687, filed on May 9, 2003, now Pat. No. 7,038,399, and a continuation-in-part of application No. 09/805,368, filed on Mar. 13, 2001, now Pat. No. 7,186,003, and a continuation-in-part of application No. 09/805,590, filed on Mar. 13, 2001, now Pat. No. 7,064,498.

(60) Provisional application No. 60/391,627, filed on Jun. 26, 2002, provisional application No. 60/379,079, filed on May 9, 2002.

(51) Int. Cl.
H05B 37/02 (2006.01)

(52) U.S. Cl. .................. 315/291; 315/DIG. 4

(58) Field of Classification Search ............ 315/200 R, 315/246, 247, 291, 307, DIG. 4
See application file for complete search history.

(56) References Cited

U.S. PATENT DOCUMENTS 3,318,185 A    5/1967 Kott (Continued)

FOREIGN PATENT DOCUMENTS

AU        6 267 9        12/1996

(Continued)

OTHER PUBLICATIONS

"LM117/LM317A/LM317 3-Terminal Adjustable Regulator," National Semiconductor Corporation, May 1997, pp. 1-20.

(Continued)

*Primary Examiner*—Thuy Vinh Tran
(74) *Attorney, Agent, or Firm*—Wolf, Greenfield & Sacks, P.C.

(57) ABSTRACT

Methods and apparatus for providing power to devices via an A.C. power source, and for facilitating the use of LED-based light sources on A.C. power circuits that provide signals other than standard line voltages. In one example, LED-based light sources may be coupled to A.C. power circuits that are controlled by conventional dimmers (i.e., "A.C. dimmer circuits"). Hence, LED-based light sources may be conveniently substituted for other light sources (e.g., incandescent lights) in lighting environments employing conventional A.C. dimming devices and/or other control signals present on the A.C. power circuit. In yet other aspects, one or more parameters relating to the light generated by LED-based light sources (e.g., intensity, color, color temperature, temporal characteristics, etc.) may be conveniently controlled via operation of a conventional A.C. dimmer and/or other signals present on the A.C. power circuit.

34 Claims, 10 Drawing Sheets

U.S. PATENT DOCUMENTS

| | | |
|---|---|---|
| 3,561,719 A | 2/1971 | Grindle |
| 3,586,936 A | 6/1971 | McLeroy |
| 3,601,621 A | 8/1971 | Ritchie |
| 3,643,088 A | 2/1972 | Osteen et al. |
| 3,746,918 A | 7/1973 | Drucker et al. |
| 3,818,216 A | 6/1974 | Larraburu |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,974,637 A | 8/1976 | Bergey et al. |
| 4,001,571 A | 1/1977 | Martin |
| 4,054,814 A | 10/1977 | Fegley et al. |
| 4,070,568 A | 1/1978 | Gala |
| 4,082,395 A | 4/1978 | Donato et al. |
| 4,096,349 A | 6/1978 | Donato |
| 4,241,295 A | 12/1980 | Williams, Jr. |
| 4,271,408 A | 6/1981 | Teshima et al. |
| 4,272,689 A | 6/1981 | Crosby et al. |
| 4,273,999 A | 6/1981 | Pierpoint |
| 4,298,869 A | 11/1981 | Okuno |
| 4,329,625 A | 5/1982 | Nishizawa et al. |
| 4,339,788 A | 7/1982 | White et al. |
| 4,342,947 A | 8/1982 | Bloyd |
| 4,367,464 A | 1/1983 | Kurahashi et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,420,711 A | 12/1983 | Takahashi et al. |
| 4,455,562 A | 6/1984 | Dolan et al. |
| 4,500,796 A | 2/1985 | Quin |
| 4,597,033 A | 6/1986 | Meggs et al. |
| 4,622,881 A | 11/1986 | Rand |
| 4,625,152 A | 11/1986 | Nakai |
| 4,635,052 A | 1/1987 | Aoike et al. |
| 4,647,217 A | 3/1987 | Havel |
| 4,656,398 A | 4/1987 | Michael et al. |
| 4,668,895 A | 5/1987 | Schneiter |
| 4,675,575 A | 6/1987 | Smith et al. |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,701,669 A | 10/1987 | Head et al. |
| 4,705,406 A | 11/1987 | Havel |
| 4,707,141 A | 11/1987 | Havel |
| 4,727,289 A | 2/1988 | Uchida |
| 4,740,882 A | 4/1988 | Miller |
| 4,753,148 A | 6/1988 | Johnson |
| 4,771,274 A | 9/1988 | Havel |
| 4,780,621 A | 10/1988 | Bartleucci et al. |
| 4,794,383 A | 12/1988 | Havel |
| 4,818,072 A | 4/1989 | Mohebban |
| 4,824,269 A | 4/1989 | Havel |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,857,801 A | 8/1989 | Farrell |
| 4,863,223 A | 9/1989 | Weissenbach et al. |
| 4,870,325 A | 9/1989 | Kazar |
| 4,874,320 A | 10/1989 | Freed et al. |
| 4,887,074 A | 12/1989 | Simon et al. |
| 4,922,154 A | 5/1990 | Cacoub |
| 4,934,852 A | 6/1990 | Havel |
| 4,962,687 A | 10/1990 | Belliveau et al. |
| 4,965,561 A | 10/1990 | Havel |
| 4,973,835 A | 11/1990 | Kurosu et al. |
| 4,979,081 A | 12/1990 | Leach et al. |
| 4,980,806 A | 12/1990 | Taylor et al. |
| 4,992,704 A | 2/1991 | Stinson |
| 5,003,227 A | 3/1991 | Nilssen |
| 5,008,595 A | 4/1991 | Kazar |
| 5,008,788 A | 4/1991 | Palinkas |
| 5,010,459 A | 4/1991 | Taylor et al. |
| 5,027,262 A | 6/1991 | Freed |
| 5,034,807 A | 7/1991 | Von Kohorn |
| 5,036,248 A | 7/1991 | McEwan et al. |
| 5,038,255 A | 8/1991 | Nishihashi et al. |
| 5,072,216 A | 12/1991 | Grange |
| 5,078,039 A | 1/1992 | Tulk et al. |
| 5,083,063 A | 1/1992 | Brooks |
| 5,089,748 A | 2/1992 | Ihms |
| 5,122,733 A | 6/1992 | Havel |
| 5,126,634 A | 6/1992 | Johnson |
| 5,128,595 A | 7/1992 | Hara |
| 5,130,909 A | 7/1992 | Gross |
| 5,134,387 A | 7/1992 | Smith et al. |
| 5,142,199 A | 8/1992 | Elwell |
| 5,154,641 A | 10/1992 | McLaughlin |
| 5,161,879 A | 11/1992 | McDermott |
| 5,164,715 A | 11/1992 | Kashiwabara et al. |
| 5,184,114 A | 2/1993 | Brown |
| 5,194,854 A | 3/1993 | Havel |
| 5,209,560 A | 5/1993 | Taylor et al. |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,278,542 A | 1/1994 | Smith et al. |
| 5,282,121 A | 1/1994 | Bornhorst et al. |
| 5,283,517 A | 2/1994 | Havel |
| 5,287,352 A | 2/1994 | Jackson et al. |
| 5,294,865 A | 3/1994 | Haraden |
| 5,298,871 A | 3/1994 | Shimohara |
| 5,301,090 A | 4/1994 | Hed |
| 5,307,295 A | 4/1994 | Taylor et al. |
| 5,329,431 A | 7/1994 | Taylor et al. |
| 5,350,977 A | 9/1994 | Hamamoto et al. |
| 5,357,170 A | 10/1994 | Luchaco et al. |
| 5,371,618 A | 12/1994 | Tai et al. |
| 5,374,876 A | 12/1994 | Horibata et al. |
| 5,375,043 A | 12/1994 | Tokunaga |
| 5,381,074 A | 1/1995 | Rudzewicz et al. |
| 5,388,357 A | 2/1995 | Malita |
| 5,402,702 A | 4/1995 | Hata |
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |
| 5,412,552 A | 5/1995 | Fernandes |
| 5,420,482 A | 5/1995 | Phares |
| 5,421,059 A | 6/1995 | Leffers, Jr. |
| 5,430,356 A | 7/1995 | Ference et al. |
| 5,432,408 A | 7/1995 | Matsuda et al. |
| 5,436,535 A | 7/1995 | Yang |
| 5,436,853 A | 7/1995 | Shimohara |
| 5,450,301 A | 9/1995 | Waltz et al. |
| 5,461,188 A | 10/1995 | Drago et al. |
| 5,463,280 A | 10/1995 | Johnson |
| 5,465,144 A | 11/1995 | Parker et al. |
| 5,475,300 A | 12/1995 | Havel |
| 5,489,827 A | 2/1996 | Xia |
| 5,491,402 A | 2/1996 | Small |
| 5,493,183 A | 2/1996 | Kimball |
| 5,504,395 A | 4/1996 | Johnson et al. |
| 5,519,496 A | 5/1996 | Borgert et al. |
| 5,530,322 A | 6/1996 | Ference et al. |
| 5,545,950 A | 8/1996 | Cho |
| 5,550,440 A | 8/1996 | Allison et al. ............... 315/294 |
| 5,559,681 A | 9/1996 | Duarte |

| | | | | | |
|---|---|---|---|---|---|
| 5,561,346 A | 10/1996 | Byrne | 6,250,774 B1 | 6/2001 | Begemann et al. |
| 5,575,459 A | 11/1996 | Anderson | 6,252,358 B1 | 6/2001 | Xydis et al. |
| 5,575,554 A | 11/1996 | Guritz | 6,273,338 B1 | 8/2001 | White |
| 5,592,051 A | 1/1997 | Korkala | 6,292,901 B1 | 9/2001 | Lys et al. |
| 5,614,788 A | 3/1997 | Mullins et al. | 6,310,590 B1 | 10/2001 | Havel |
| 5,621,282 A | 4/1997 | Haskell | 6,323,832 B1 | 11/2001 | Nishizawa et al. |
| 5,621,603 A | 4/1997 | Adamec et al. | 6,340,868 B1 | 1/2002 | Lys et al. |
| 5,633,629 A | 5/1997 | Hockstein | 6,369,525 B1 | 4/2002 | Chang et al. |
| 5,634,711 A | 6/1997 | Kennedy et al. | 6,379,022 B1 | 4/2002 | Amerson et al. |
| 5,640,061 A | 6/1997 | Bornhorst et al. | 6,445,139 B1 | 9/2002 | Marshall et al. |
| 5,642,129 A | 6/1997 | Zavracy et al. | 6,448,550 B1 | 9/2002 | Nishimura |
| 5,656,935 A | 8/1997 | Havel | 6,459,919 B1 | 10/2002 | Lys et al. |
| 5,673,059 A | 9/1997 | Zavracy et al. | 6,469,457 B2 | 10/2002 | Callahan ..................... 315/294 |
| 5,688,042 A | 11/1997 | Madadi et al. | 6,495,964 B1 | 12/2002 | Muthu et al. |
| 5,701,058 A | 12/1997 | Roth | 6,528,954 B1 | 3/2003 | Lys et al. |
| 5,712,650 A | 1/1998 | Barlow | 6,548,967 B1 | 4/2003 | Dowling et al. |
| 5,721,471 A | 2/1998 | Begemann et al. | 6,577,080 B2 | 6/2003 | Lys et al. |
| 5,734,590 A | 3/1998 | Tebbe | 6,586,890 B2 | 7/2003 | Min et al. |
| 5,751,118 A | 5/1998 | Mortimer | 6,596,977 B2 | 7/2003 | Muthu et al. |
| 5,752,766 A | 5/1998 | Bailey et al. | 6,608,453 B2 | 8/2003 | Morgan et al. |
| 5,769,527 A | 6/1998 | Taylor et al. | 6,624,597 B2 | 9/2003 | Dowling et al. |
| 5,784,006 A | 7/1998 | Hockstein | 6,636,003 B2 | 10/2003 | Rahm et al. |
| 5,790,329 A | 8/1998 | Klaus et al. | 6,683,419 B2 | 1/2004 | Kriparos |
| 5,803,579 A | 9/1998 | Turnbull et al. | 6,717,376 B2 | 4/2004 | Lys et al. |
| 5,808,689 A | 9/1998 | Small | 6,720,745 B2 | 4/2004 | Mueller et al. |
| 5,812,105 A | 9/1998 | Van de Ven | 6,744,223 B2 | 6/2004 | Laflamme et al. |
| 5,821,695 A | 10/1998 | Vilanilam et al. | 6,774,584 B2 | 8/2004 | Lys et al. |
| 5,828,178 A | 10/1998 | York et al. | 6,777,891 B2 | 8/2004 | Lys et al. |
| 5,836,676 A | 11/1998 | Ando et al. | 6,781,329 B2 | 8/2004 | Morgan et al. |
| 5,848,837 A | 12/1998 | Gustafson | 6,788,011 B2 | 9/2004 | Mueller et al. |
| 5,850,126 A | 12/1998 | Kanbar | 6,801,003 B2 | 10/2004 | Schanberger et al. |
| 5,851,063 A | 12/1998 | Doughty et al. | 6,806,659 B1 | 10/2004 | Mueller et al. |
| 5,852,658 A | 12/1998 | Knight et al. | 6,869,204 B2 | 3/2005 | Piepgras et al. |
| 5,854,542 A | 12/1998 | Forbes | 6,883,929 B2 | 4/2005 | Dowling |
| 5,859,508 A | 1/1999 | Ge et al. | 6,888,322 B2 | 5/2005 | Dowling et al. |
| 5,896,010 A | 4/1999 | Mikolajczak et al. | 6,897,624 B2 | 5/2005 | Ducharme et al. |
| 5,907,742 A | 5/1999 | Johnson et al. | 6,936,978 B2 | 8/2005 | Morgan et al. |
| 5,912,653 A | 6/1999 | Fitch | 6,965,205 B2 | 11/2005 | Piepgras et al. |
| 5,924,784 A | 7/1999 | Chliwnyj et al. | 6,967,448 B2 | 11/2005 | Morgan et al. |
| 5,927,845 A | 7/1999 | Gustafson et al. | 6,969,954 B2 | 11/2005 | Lys |
| 5,946,209 A | 8/1999 | Eckel et al. | 6,975,079 B2 | 12/2005 | Lys et al. |
| 5,952,680 A | 9/1999 | Strite | 7,031,920 B2 | 4/2006 | Dowling et al. |
| 5,959,547 A | 9/1999 | Tubel et al. | 7,038,398 B1 | 5/2006 | Lys et al. |
| 5,963,185 A | 10/1999 | Havel | 7,038,399 B2 | 5/2006 | Lys et al. |
| 5,974,553 A | 10/1999 | Gandar | 7,042,172 B2 | 5/2006 | Dowling et al. |
| 5,980,064 A | 11/1999 | Metroyanis | 2001/0045803 A1 | 11/2001 | Cencur |
| 6,008,783 A | 12/1999 | Kitagawa et al. | 2002/0038157 A1 | 3/2002 | Dowling et al. |
| 6,016,038 A | 1/2000 | Mueller et al. | 2002/0048169 A1 | 4/2002 | Dowling et al. |
| 6,018,237 A | 1/2000 | Havel | 2002/0070688 A1 | 6/2002 | Dowling et al. |
| 6,020,825 A | 2/2000 | Chansky et al. | 2002/0074559 A1 | 6/2002 | Dowling et al. |
| 6,025,550 A | 2/2000 | Kato | 2002/0078221 A1 | 6/2002 | Blackwell et al. |
| 6,031,343 A | 2/2000 | Recknagel et al. | 2002/0130627 A1 | 9/2002 | Dowling et al. |
| 6,068,383 A | 5/2000 | Robertson et al. | 2002/0145394 A1 | 10/2002 | Morgan et al. |
| 6,069,597 A | 5/2000 | Hansen | 2002/0145869 A1 | 10/2002 | Dowling |
| 6,072,280 A | 6/2000 | Allen | 2002/0152045 A1 | 10/2002 | Dowling et al. |
| 6,092,915 A | 7/2000 | Rensch | 2002/0158583 A1 | 10/2002 | Lys et al. |
| 6,095,661 A | 8/2000 | Lebens et al. | 2002/0176259 A1 | 11/2002 | Ducharme |
| 6,097,352 A | 8/2000 | Zavracy et al. | 2003/0011538 A1 | 1/2003 | Lys et al. |
| 6,127,783 A | 10/2000 | Pashley et al. | 2003/0028260 A1 | 2/2003 | Blackwell |
| 6,132,072 A | 10/2000 | Turnbull et al. | 2003/0057884 A1 | 3/2003 | Dowling et al. |
| 6,135,604 A | 10/2000 | Lin | 2003/0057887 A1 | 3/2003 | Dowling et al. |
| 6,149,283 A | 11/2000 | Conway et al. | 2003/0076281 A1 | 4/2003 | Morgan et al. |
| 6,150,774 A | 11/2000 | Mueller et al. | 2003/0100837 A1 | 5/2003 | Lys et al. |
| 6,166,496 A | 12/2000 | Lys et al. | 2003/0133292 A1 | 7/2003 | Mueller et al. |
| 6,175,201 B1 | 1/2001 | Sid | 2003/0222587 A1 | 12/2003 | Dowling et al. |
| 6,175,220 B1 | 1/2001 | Billig et al. | 2004/0036006 A1 | 2/2004 | Dowling |
| 6,181,126 B1 | 1/2001 | Havel | 2004/0052076 A1 | 3/2004 | Mueller et al. |
| 6,183,086 B1 | 2/2001 | Neubert | 2004/0090191 A1 | 5/2004 | Mueller et al. |
| 6,183,104 B1 | 2/2001 | Ferrara | 2004/0090787 A1 | 5/2004 | Dowling et al. |
| 6,184,628 B1 | 2/2001 | Ruthenber | 2004/0105261 A1 | 6/2004 | Ducharme et al. |
| 6,196,471 B1 | 3/2001 | Ruthenber | 2004/0116039 A1 | 6/2004 | Mueller et al. |
| 6,211,626 B1 | 4/2001 | Lys et al. | 2004/0130909 A1 | 7/2004 | Mueller et al. |
| 6,215,409 B1 | 4/2001 | Blach | 2004/0178751 A1 | 9/2004 | Mueller et al. |

| | | | |
|---|---|---|---|
| 2004/0212320 A1 | 10/2004 | Dowling et al. | |
| 2004/0212993 A1 | 10/2004 | Morgan et al. | |
| 2005/0024877 A1* | 2/2005 | Frederick | 362/277 |
| 2005/0099824 A1 | 5/2005 | Dowling et al. | |
| 2005/0116667 A1 | 6/2005 | Mueller et al. | |
| 2005/0151489 A1 | 7/2005 | Lys et al. | |
| 2005/0213352 A1 | 9/2005 | Lys et al. | |
| 2005/0213353 A1 | 9/2005 | Lys | |
| 2005/0218838 A1 | 10/2005 | Lys | |
| 2005/0218870 A1 | 10/2005 | Lys | |
| 2005/0219872 A1 | 10/2005 | Lys | |
| 2005/0231133 A1 | 10/2005 | Lys | |
| 2005/0236029 A1 | 10/2005 | Dowling | |
| 2005/0236998 A1 | 10/2005 | Mueller | |
| 2005/0253533 A1 | 11/2005 | Lys et al. | |
| 2005/0275626 A1 | 12/2005 | Mueller | |
| 2005/0276053 A1 | 12/2005 | Nortrup | |
| 2006/0002110 A1 | 1/2006 | Dowling | |
| 2006/0012987 A9 | 1/2006 | Ducharme | |
| 2006/0016960 A1 | 1/2006 | Morgan | |
| 2006/0022214 A1 | 2/2006 | Morgan | |
| 2006/0050509 A9 | 3/2006 | Dowling | |
| 2006/0076908 A1 | 4/2006 | Morgan | |
| 2006/0098077 A1 | 5/2006 | Dowling | |
| 2006/0104058 A1 | 5/2006 | Chemel et al. | |
| 2006/0109649 A1 | 5/2006 | Ducharme et al. | |

FOREIGN PATENT DOCUMENTS

| | | |
|---|---|---|
| CA | 2 134 848 | 5/1995 |
| CA | 2 178 432 | 12/1996 |
| DE | 02315709 | 10/1974 |
| DE | 0205307 | 12/1983 |
| DE | 03438154 A1 | 4/1986 |
| DE | 3837313 | 5/1989 |
| DE | 3805998 | 9/1989 |
| DE | 3925767 A1 | 4/1990 |
| DE | 8902905 | 5/1990 |
| DE | 3917101 | 11/1990 |
| DE | 3916875 | 12/1990 |
| DE | 4041338 | 7/1992 |
| DE | 4130576 C1 | 3/1993 |
| DE | 9414688 U1 | 2/1995 |
| DE | 9414689 | 2/1995 |
| DE | 4419006 A1 | 12/1995 |
| DE | 29607270 U1 | 8/1996 |
| DE | 19525987 | 10/1996 |
| DE | 29620583 U1 | 3/1997 |
| DE | 19651140 A1 | 6/1997 |
| DE | 19602891 A1 | 7/1997 |
| EP | 0482680 A1 | 4/1992 |
| EP | 0495305 A2 | 7/1992 |
| EP | 0567280 B1 | 10/1993 |
| EP | 0534710 B1 | 1/1996 |
| EP | 0734082 A2 | 9/1996 |
| EP | 0752632 A2 | 1/1997 |
| EP | 0752632 A3 | 8/1997 |
| EP | 0823812 A2 | 2/1998 |
| EP | 0935234 A1 | 8/1999 |
| EP | 0942631 A2 | 9/1999 |
| EP | 1020352 A2 | 7/2000 |
| EP | 1113215 A2 | 7/2001 |
| EP | 1162400 A2 | 12/2001 |
| FR | 2 640 791 | 6/1990 |
| FR | 88 17359 | 12/1998 |
| GB | 2045098 A | 10/1980 |
| GB | 2131589 A | 11/1982 |
| GB | 2176042 A | 12/1986 |
| GB | 2210720 A | 6/1989 |
| GB | 2135536 A | 8/1994 |
| JP | 02-007393 | 1/1990 |
| JP | 2247688 | 10/1990 |
| JP | 03045166 | 2/1991 |
| JP | 06043830 | 2/1994 |
| JP | 7-39120 | 7/1995 |
| JP | 07-282614 | 10/1995 |
| JP | 8-106264 | 4/1996 |
| JP | 09-139289 | 5/1997 |
| JP | 3076701 | 1/2001 |
| KR | 1019910009812 | 11/1991 |
| WO | WO 89/05086 | 6/1989 |
| WO | WO 94/18809 | 8/1994 |
| WO | WO 95/13498 | 5/1995 |
| WO | WO 96/41098 | 12/1996 |
| WO | WO 99/06759 | 2/1999 |
| WO | WO 02/061328 A1 | 8/2002 |

OTHER PUBLICATIONS

"DS96177 RS-485 / RS-422 Differential Bus Repeater," National Semiconductor Corporation, Feb. 1996, pp. 1-8.
"DS2003 / DA9667 / DS2004 High Current / Voltage Darlington Drivers," National Semiconductor Corporation, Dec. 1995, pp. 1-8.
"LM140A / LM140 / LM340A / LM78000 Series 3—Terminal Positive Regulators," National Semiconductor Corporation, Jan. 1995, pp. 1-14.
High End Systems, Inc., Trackspot User Manual, Aug. 1997, Excerpts (Cover, Title page, pp. ii through iii and 2-13 through 2-14).
Artistic License, AL4000 DMX512 Processors, Revision 3.4, Jun. 2000, Excerpts (Cover, pp. 7, 92 through 102.
Artistic License, Miscellaneous Drawings 3 sheets Jan. 12, 1995.
Artistic License, Miscellaneous Documents 2 sheets Feb. 1995 and Apr. 1996.
Newnes's Dictionary of Electronics, Fourth Edition, S.W. Amos, et al., Preface to First Edition, pp. 278-279.
"http://www.luniinus.cx/projects/chaser," (Nov. 13, 2000), pp. 1-16.
Hewlett Packard Components, "Solid State Display and Optoelectronics Designer's Catalog," pp. 30-43, Jul. 1973.
INTEC Research, TRACKSPOT, http://www.intec-research.com/trackspot.htm, pp. 1-4, Apr. 24, 2003.
SHARP, Optoelectronics Data Book, pp. 1096-1097, 1994/1995.
About DMX-512 Lighting Protocol—Pangolin Laser Systems, pp. 1-4, Apr. 7, 2003.
Avitec Licht Design '89-90, pp. 1-4.
Furry, Kevin and Somerville, Chuck, Affidavit, LED effects, Feb. 22, 2002, pp. 24-29.
Putman, Peter H., "The Allure of LED," www.sromagazine.biz, Jun./Jul. 2002, pp. 47-52.
Bremer, Darlene, "LED Advancements Increase Potential," www.ecmag.com, Apr. 2002, p. 115.
Longo, Linda, "LEDS Lead the Way," Home Lighting & Accessories, Jun. 2002, pp. 226-234.

* cited by examiner

METHODS AND APPARATUS FOR PROVIDING POWER TO LIGHTING DEVICES

CROSS-REFERENCE TO RELATED APPLICATIONS

This application claims the benefit, under 35 U.S.C. §120, as a continuation of U.S. non-provisional application Ser. No. 10/435,687, filed May 9, 2003, entitled Methods and Apparatus for Providing Power to Lighting Devices," which is now U.S Pat. No. 7,038,399, which is hereby incorporated herein by reference.

Ser. No. 10/435,687 in turn claims the benefit, under 35 U.S.C. § 119(e), of U.S. Provisional Application Ser. No. 60/379,079, filed May 9, 2002, entitled "Systems and Methods for Controlling LED Based Lighting," and U.S. Provisional Application Ser. No. 60/391,627, filed Jun. 26, 2002, entitled "Switched Current Sink," which applications are hereby incorporated herein by reference.

Ser. No. 10/435,687 also claims the benefit under 35 U.S.C. §120 as a continuation-in-part (CIP) of the following U.S. non-provisional applications:

Ser. No. 09/805,368, filed Mar. 13, 2001, entitled LIGHT-EMITTING DIODE BASED PRODUCTS, which is now U.S. Pat. No. 7,186,003; and Ser. No. 09/805,590, filed Mar. 13, 2001, entitled LIGHT-EMITTING DIODE BASED PRODUCTS, which is now U.S. Pat. No. 7,064,498.

FIELD OF THE INVENTION

The present invention is directed generally to methods and apparatus for providing power to devices on A.C. power circuits. More particularly, the invention relates to methods and apparatus for providing power to light emitting diode (LED) based devices, primarily for illumination purposes.

BACKGROUND

In various lighting applications (e.g., home, commercial, industrial, etc.), there are instances in which it is desirable to adjust the amount of light generated by one or more conventional light sources (e.g., incandescent light bulbs, fluorescent light fixtures, etc.). In many cases, this is accomplished via a user-operated device, commonly referred to as a "dimmer," that adjusts the power delivered to the light source(s). Many types of conventional dimmers are known that allow a user to adjust the light output of one or more light sources via some type of user interface (e.g., by turning a knob, moving a slider, etc., often mounted on a wall in proximity to an area in which it is desirable to adjust the light level). The user interface of some dimmers also may be equipped with a switching/adjustment mechanism that allows one or more light sources to be switched off and on instantaneously, and also have their light output gradually varied when switched on.

Many lighting systems for general interior or exterior illumination often are powered by an A.C. source, commonly referred to as a "line voltage" (e.g., 120 Volts RMS at 60 Hz, 220 Volts RMS at 50 Hz). A conventional A.C. dimmer typically receives the A.C. line voltage as an input, and provides an A.C. signal output having one or more variable parameters that have the effect of adjusting the average voltage of the output signal (and hence the capability of the A.C. output signal to deliver power) in response to user operation of the dimmer. This dimmer output signal generally is applied, for example, to one or more light sources that are mounted in conventional sockets or fixtures coupled to the dimmer output (such sockets or fixtures sometimes are referred to as being on a "dimmer circuit").

Conventional A.C. dimmers may be configured to control power delivered to one or more light sources in one of a few different ways. For example, in one implementation, the adjustment of the user interface causes the dimmer to increase or decrease a voltage amplitude of the A.C. dimmer output signal. More commonly, however, in other implementations, the adjustment of the user interface causes the dimmer to adjust the duty cycle of the A.C. dimmer output signal (e.g., by "chopping-out" portions of A.C. voltage cycles). This technique sometimes is referred to as "angle modulation" (based on the adjustable phase angle of the output signal). Perhaps the most commonly used dimmers of this type employ a triac that is selectively operated to adjust the duty cycle (i.e., modulate the phase angle) of the dimmer output signal by chopping-off rising portions of A.C. voltage half-cycles (i.e., after zero-crossings and before peaks). Other types of dimmers that adjust duty cycles may employ gate turn-off (GTO) thyristors that are selectively operated to chop-off falling portions of A.C. voltage half-cycles (i.e., after peaks and before zero-crossings).

FIG. 1 generally illustrates some conventional A.C. dimmer implementations. In particular, FIG. 1 shows an example of an A.C. voltage waveform 302 (e.g., representing a standard line voltage) that may provide power to one or more conventional light sources. FIG. 1 also shows a generalized A.C. dimmer 304 responsive to a user interface 305. In the first implementation discussed above, the dimmer 304 is configured to output the waveform 308, in which the amplitude 307 of the dimmer output signal may be adjusted via the user interface 305. In the second implementation discussed above, the dimmer 304 is configured to output the waveform 309, in which the duty cycle 306 of the waveform 309 may be adjusted via the user interface 305.

As discussed above, both of the foregoing techniques have the effect of adjusting the average voltage applied to the light source(s), which in turn adjusts the intensity of light generated by the source(s). Incandescent sources are particularly well-suited for this type of operation, as they produce light when there is current flowing through a filament in either direction; as the average voltage of an A.C. signal applied to the source(s) is adjusted (e.g., either by an adjustment of voltage amplitude or duty cycle), the current (and hence the power) delivered to the light source also is changed and the corresponding light output changes. With respect to the duty cycle technique, the filament of an incandescent source has thermal inertia and does not stop emitting light completely during short periods of voltage interruption. Accordingly, the generated light as perceived by the human eye does not appear to flicker when the voltage is "chopped," but rather appears to gradually change.

SUMMARY

The present invention is directed generally to methods and apparatus for providing power to devices on A.C. power circuits. More particularly, methods and apparatus according to various embodiments of the present invention facilitate the use of LED-based light sources on A.C. power circuits that provide either a standard line voltage or signals other than standard line voltages.

In one embodiment, methods and apparatus of the invention particularly facilitate the use of LED-based light sources on A.C. power circuits that are controlled by conventional dimmers (i.e., "A.C. dimmer circuits"). In one aspect, methods and apparatus of the present invention facilitate convenient substitution of LED-based light sources in lighting environments employing A.C. dimming devices and conventional light sources. In yet other aspects, methods and apparatus according to the present invention facilitate the control of one or more parameters relating to the light generated by LED-based light sources (e.g., intensity, color, color temperature, temporal characteristics, etc.) via operation of a conventional A.C. dimmer and/or other signals present on the A.C. power circuit.

More generally, one embodiment of the invention is directed to an illumination apparatus, comprising at least one LED and at least one controller coupled to the at least one LED. The controller is configured to receive a power-related signal from an A.C. power source that provides signals other than a standard A.C. line voltage. The controller further is configured to provide power to the at least one LED based on the power-related signal.

Another embodiment of the invention is directed to an illumination method, comprising an act of providing power to at least one LED based on a power-related signal from an A.C. power source that provides signals other than a standard A.C. line voltage.

Another embodiment of the invention is directed to an illumination apparatus, comprising at least one LED, and at least one controller coupled to the at least one LED and configured to receive a power-related signal from an alternating current (A.C.) dimmer circuit and provide power to the at least one LED based on the power-related signal.

Another embodiment of the invention is directed to an illumination method, comprising an act of providing power to at least one LED based on a power-related signal from an alternating current (A.C.) dimmer circuit.

Another embodiment of the invention is directed to an illumination apparatus, comprising at least one LED adapted to generate an essentially white light, and at least one controller coupled to the at least one LED and configured to receive a power-related signal from an alternating current (A.C.) dimmer circuit and provide power to the at least one LED based on the power-related signal. The A.C. dimmer circuit is controller by a user interface to vary the power-related signal. The controller is configured to variably control at least one parameter of the essentially white light in response to operation of the user interface so as to approximate light generation characteristics of an incandescent light source.

Another embodiment of the invention is directed to a lighting system, comprising at least one LED, a power connector, and a power converter associated with the power connector and adapted to convert A.C. dimmer circuit power received by the power connector to form a converted power. The system also includes an adjustment circuit associated with the power converter adapted to adjust power delivered to the at least one LED.

Another embodiment of the invention is directed to a method of providing illumination, comprising the steps of providing an AC dimmer circuit, connecting an LED lighting system to the AC dimmer circuit, generating light from the LED lighting system by energizing the AC dimmer circuit, and adjusting the light generated by the LED lighting system by adjusting the AC dimmer circuit.

Another embodiment of the invention is directed to method for controlling at least one device powered via an A.C. line voltage. The method comprises an act of generating a power signal based on the A.C. line voltage, wherein the power signal provides an essentially constant power to the at least one device and includes at least one communication channel carrying control information for the at least one device, the at least one communication channel occupying a portion of a duty cycle over a period of cycles of the A.C. line voltage.

Another embodiment of the invention is directed to an apparatus for controlling at least one device powered via an A.C. line voltage. The apparatus comprises a supply voltage controller configured to generate a power signal based on the A.C. line voltage, wherein the power signal provides an essentially constant power to the at least one device and includes at least one communication channel carrying control information for the at least one device, the at least one communication channel occupying a portion of a duty cycle over a period of cycles of the A.C. line voltage. In one aspect of this embodiment, the supply voltage controller includes at least one user interface to provide variable control information in the at least one communication channel.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, electroluminescent strips, and the like.

In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured to generate radiation having various bandwidths for a given spectrum (e.g., narrow bandwidth, broad bandwidth).

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (employing one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyroluminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication and/or illumination. An "illumination source" is a light source that is particularly configured to generate radiation having a sufficient intensity to effectively illuminate an interior or exterior space.

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. The color temperature of white light generally falls within a range of from approximately 700 degrees K (generally considered the first visible to the human eye) to over 10,000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The terms "lighting unit" and "lighting fixture" are used interchangeably herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The terms "processor" or "controller" are used herein interchangeably to describe various apparatus relating to the operation of one or more light sources. A processor or controller can be implemented in numerous ways, such as with dedicated hardware, using one or more microprocessors that are programmed using software (e.g., microcode) to perform the various functions discussed herein, or as a combination of dedicated hardware to perform some functions and programmed microprocessors and associated circuitry to perform other functions.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present invention, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present invention include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated the all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter.

The following patents and patent applications are hereby incorporated herein by reference:

U.S. Pat. No. 6,016,038, issued Jan. 18, 2000, entitled "Multicolored LED Lighting Method and Apparatus;"

U.S. Pat. No. 6,211,626, issued Apr. 3, 2001 to Lys et al, entitled "Illumination Components,"

U.S. patent application Ser. No. 09/870,193, filed May 30, 2001, entitled "Methods and Apparatus for Controlling Devices in a Networked Lighting System;"

U.S. patent application Ser. No. 09/344,699, filed Jun. 25, 1999, entitled "Method for Software Driven Generation of Multiple Simultaneous High Speed Pulse Width Modulated Signals;"

U.S. patent application Ser. No. 09/805,368, filed Mar. 13, 2001, entitled "Light-Emitting Diode Based Products;"

U.S. patent application Ser. No. 09/663,969, filed Sep. 19, 2000, entitled "Universal Lighting Network Methods and Systems;"

U.S. patent application Ser. No. 09/716,819, filed Nov. 20, 2000, entitled "Systems and Methods for Generating and Modulating Illumination Conditions;"

U.S. patent application Ser. No. 09/675,419, filed Sep. 29, 2000, entitled "Systems and Methods for Calibrating Light Output by Light-Emitting Diodes;"

U.S. patent application Ser. No. 09/870,418, filed May 30, 2001, entitled "A Method and Apparatus for Authoring and Playing Back Lighting Sequences;"

U.S. patent application Ser. No. 10/045,629, filed Oct. 25, 2001, entitled "Methods and Apparatus for Controlling Illumination;"

U.S. patent application Ser. No. 10/143,549, filed May 10, 2002, entitled "Systems and Methods for Synchronizing Lighting Effects;"

U.S. patent application Ser. No. 10/158,579, filed May 30, 2002, entitled "Methods and Apparatus for Controlling Devices in a Networked Lighting System;"

U.S. patent application Ser. No. 10/325,635, filed Dec. 19, 2002, entitled "Controlled Lighting Methods and Apparatus;" and U.S. patent application Ser. No. 10/360,594, filed Feb. 6, 2003, entitled "Controlled Lighting Methods and Apparatus."

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

DETAILED DESCRIPTION

Overview

Light Emitting Diode (LED) based illumination sources are becoming more popular in applications where general, task, accent, or other lighting is desired. LED efficiencies, high intensities, low cost, and high level of controllability are driving demand for LED-based light sources as replacements for conventional non LED-based light sources.

While conventional A.C. dimming devices as discussed above often are employed to control conventional light sources such as incandescent lights using an A.C. power source, Applicants have recognized and appreciated that generally such dimmers are not acceptable for use with solid-state light sources such as LED-based light sources. Stated differently, Applicants have identified that LED-based light sources, which operate based on substantially D.C. power sources, generally are incompatible with dimmer circuits that provide A.C. output signals. This situation impedes convenient substitution of LED-based light sources into pre-existing lighting systems in which conventional light sources are operated via A.C. dimmer circuits.

Figure 2:
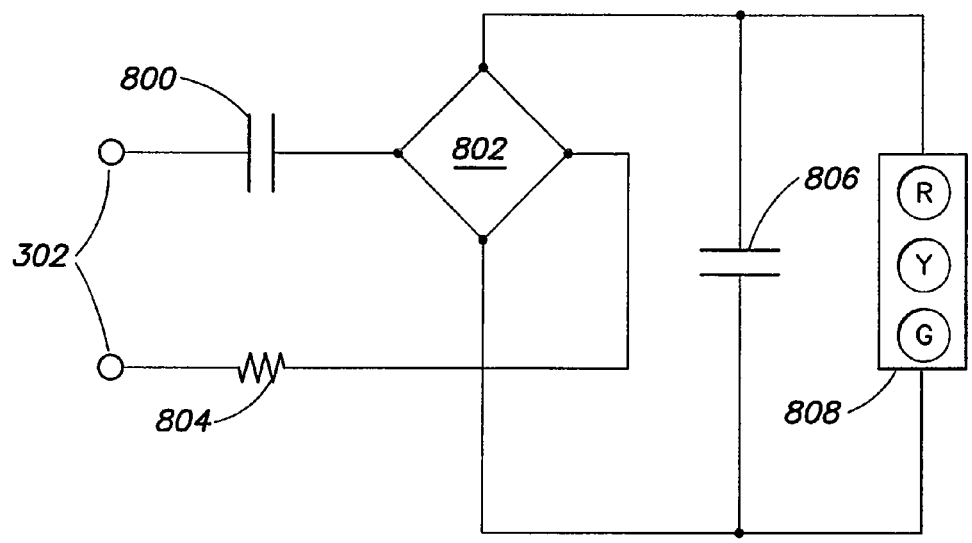
FIG. 2 illustrates a conventional implementation for providing power to an LED-based light source from an A.C. line voltage.

There are some solutions currently for providing power to LED-based lighting systems via an A.C. line voltage, but these solutions suffer from significant drawbacks if applied to A.C. dimmer circuits. FIG. 2 illustrates one such generalized scenario, in which a standard A.C. line voltage 302 (e.g., 120 Vrms, 220 Vrms, etc.) is used to power an LED-based lighting system, such as a traffic light 808 (the traffic light includes three modules of LED arrays, one red, one yellow and one green, with associated circuitry). In the arrangement of FIG. 2, a full-wave rectifier 802, together with capacitors 800 and 806 and resistor 804, filter the applied A.C. line voltage so as to supply a substantially D.C. source of power for the traffic light 808. In particular, the capacitor 800 may be specifically selected, depending on the impedance of other circuit components, such that energy is passed to the traffic light based primarily on the expected frequency of the A.C. line voltage (e.g., 60 Hz).

Figure 1:
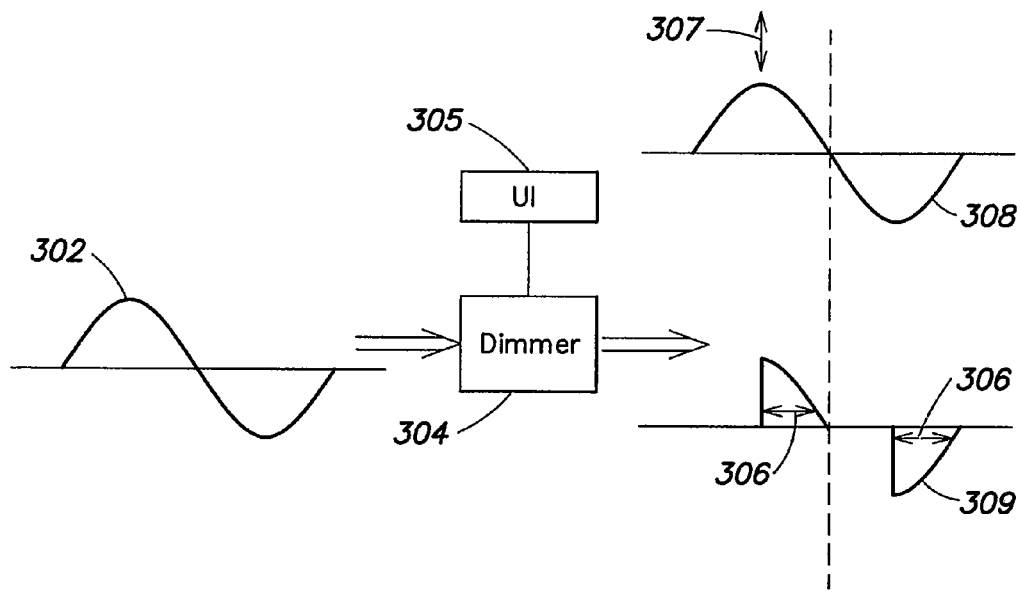
FIG. 1 illustrates exemplary operation of conventional A.C. dimming devices.

One problem with the arrangement shown in FIG. 2 if the applied A.C. signal is provided by a dimmer circuit rather than as a line voltage is that the applied signal may include frequency components that are significantly different from the frequency of the line voltage for which the circuit was designed. For example, consider a dimmer circuit that provides a duty cycle-controlled (i.e., angle modulated) A.C. signal 309 such as that shown in FIG. 1; by virtue of the abrupt signal excursions due to the "chopping-off" of portions of voltage cycles, signals of this type include significantly higher frequency components than a typical line voltage. Were such an angle modulated A.C. signal to be applied to the arrangement of FIG. 2, the capacitor 800 would allow excess energy associated with these higher frequency components to pass through to the traffic light, in most cases causing fatal damage to the light sources.

In view of the foregoing, one embodiment of the present invention is directed generally to methods and apparatus for facilitating the use of LED-based light sources on A.C. power circuits that provide either a standard line voltage or that are controlled by conventional dimmers (i.e., "A.C. dimmer circuits"). In one aspect, methods and apparatus of the present invention facilitate convenient substitution of LED-based light sources in lighting environments employing conventional dimming devices and conventional light sources. In yet other aspects, methods and apparatus according to the present invention facilitate the control of one or more parameters relating to the light generated by LED-based light sources (e.g., intensity, color, color temperature, temporal characteristics, etc.) via operation of a conventional dimmer and/or other control signals that may be present in connection with an A.C. line voltage.

Lighting units and systems employing various concepts according to the principles of the present invention may be used in a residential setting, commercial setting, industrial setting or any other setting where conventional A.C. dimmers are found or are desirable. Furthermore, the various concepts disclosed herein may be applied in lighting units according to the present invention to ensure compatibility of the lighting units with a variety of lighting control protocols that provide various control signals via an A.C. power circuit.

One example of such a control protocol is given by the X10 communications language, which allows X10-compatible products to communicate with each other via existing electrical wiring in a home (i.e., wiring that supplies a standard A.C. line voltage). In a typical X10 implementation, an appliance to be controlled (e.g., lights, thermostats, jacuzzi/hot tub, etc.) is plugged into an X10 receiver, which in turn plugs into a conventional wall socket coupled to the A.C. line voltage. The appliance to be controlled can be assigned with a particular address. An X10 transmitter/controller is plugged into another wall socket coupled to the line voltage, and communicates control commands (e.g., on, off, dim, bright, etc.), via the same wiring providing the line voltage, to one or more X10 receivers based at least in part on the assigned address(es) (further information regarding X10 implementations may be found at the website "www.s-marthome.com"). According to one embodiment, methods and apparatus of the present invention facilitate compatibility of various LED-based light sources and lighting units with X10 and other communication protocols that communicate control information in connection with an A.C. line voltage.

In general, methods and apparatus according to the present invention allow a substantially complete retrofitting of a lighting environment with solid state LED-based light sources; in particular, pursuant to the present invention, the use of LED-based light sources as substitutes for incandescent light sources is not limited to only those A.C. power circuits that are supplied directly from a line voltage (e.g., via a switch); rather, methods and apparatus of the present invention allow LED-based light sources to be used in most any conventional (e.g., incandescent) socket, including those coupled to an A.C. dimmer circuit and/or receiving signals other than a standard line voltage.

In various embodiments, an LED-based lighting unit or fixture according to the invention may include a controller to appropriately condition an A.C. signal provided by a dimmer circuit so as to provide power to (i.e., "drive") one or more LEDs of the lighting unit. The controller may drive the LED(s) using any of a variety of techniques, including analog control techniques, pulse width modulation (PWM) techniques or other power regulation techniques. Although not an essential feature of the present invention, in some embodiments the circuitry of the LED-based lighting unit may include one or more microprocessors that are programmed to carry out various signal conditioning and/or light control functions. In various implementations of both processor and non-processor based embodiments, an LED-based lighting unit according to the invention may be configured for operation on an A.C. dimmer circuit with or without provisions for allowing one or more parameters of generated light to be adjusted via user operation of the dimmer.

More specifically, in one embodiment, an LED-based lighting unit may include a controller wherein at least a portion of the power delivered to the controller, as derived from an A.C. dimmer circuit, is regulated at a substantially constant value over a significant range of dimmer operation so as to provide an essentially stable power source for the controller and other circuitry associated with the lighting unit. In one aspect of this embodiment, the controller also may be configured to monitor the adjustable power provided by the dimmer circuit so as to permit adjustment of one or more parameters of the light generated by the lighting unit in response to operation of the dimmer.

In particular, there are several parameters of light generated by an LED-based light source (other than, or in addition to, intensity or brightness, for example) that may be controlled in response to dimmer operation according to the present invention. For example, in various embodiments, an LED-based lighting unit may be configured such that one or more properties of the generated light such as color (e.g., hue, saturation or brightness), or the correlated color temperature of white light, as well as temporal parameters (e.g., rate of color variation or strobing of one or more colors) are adjustable via dimmer operation.

As discussed above, in one embodiment, an LED-based lighting unit may include one or more processor-based controllers, including one or more memory storage devices, to facilitate the foregoing and other examples of adjustable light generation via dimmer operation. In particular, in one embodiment, such a lighting unit may be configured to selectively execute, via dimmer operation, one or more lighting programs stored in controller memory. Such lighting programs may represent various static or time-varying lighting effects involving multiple colors, color temperatures, and intensities of generated light, for example. In one aspect of this embodiment, the processor-based controller of the lighting unit may be configured to monitor the A.C. signal provided by the dimmer circuit so as to select different programs and/or program parameters based on one or more changes in the monitored dimmer signal having a particular characteristic (e.g., a particular instantaneous value relating to the dimmer signal, a particular time averaged value relating to the dimmer signal, an interruption of power provided by the dimmer for a predetermined duration, a particular rate of change of the dimmer signal, etc). Upon the selection of a new program or parameter, further operation of the dimmer may adjust the selected parameter or program.

In another exemplary embodiment, an LED-based lighting unit according to the present invention may be configured to be coupled to an A.C. dimmer circuit and essentially recreate the lighting characteristics of a conventional incandescent light as a dimmer is operated to increase or decrease the intensity of the generated light. In one aspect of this embodiment, this simulation may be accomplished by simultaneously varying the intensity and the color of the light generated by the LED-based source in response to dimmer operation, so as to approximate the variable lighting characteristics of an incandescent source whose intensity is varied. In another aspect of this embodiment, such a simulation is facilitated by a processor-based controller particularly programmed to monitor an A.C. signal provided by the dimmer circuit and respectively control differently colored LEDs of the lighting unit in response to dimmer operation so as to simultaneously vary both the overall color and intensity of the light generated by the lighting unit.

While many of the lighting effects discussed herein are associated with dimmer compatible control, several effects may be generated according to the present invention using other control systems as well. For example, the color temperature of an LED-based light source may be programmed to reduce as the intensity is reduced and these lighting changes may be controlled by a system other than a dimmer system (e.g. wireless communication, wired communication and the like) according to various embodiments of the invention.

Another embodiment of the present invention is directed to a method for selling, marketing, and advertising of LED-based light sources and lighting systems. The method may include advertising an LED lighting system compatible with conventional A.C. dimmers or dimming systems. The method may also include advertising an LED light that is compatible with both dimmable and non-dimmable lighting control systems.

Following below are more detailed descriptions of various concepts related to, and embodiments of, methods and apparatus for providing power to LED-based lighting according to the present invention. It should be appreciated that various aspects of the invention, as discussed above and outlined further below, may be implemented in any of numerous ways, as the invention is not limited to any particular manner of implementation. Examples of specific implementations are provided for illustrative purposes only.

Non-Processor Based Exemplary Embodiments

As discussed above, according to various embodiments, LED-based light sources capable of operation via A.C. dimmer circuits may be implemented with or without microprocessor-based circuitry. In this section, some examples are given of lighting units that include circuitry configured to appropriately condition A.C. signals provided by a dimmer circuit without the aid of a microprocessor or microcontroller. In the sections that follow, a number of processor-based examples are discussed.

Figure 3:
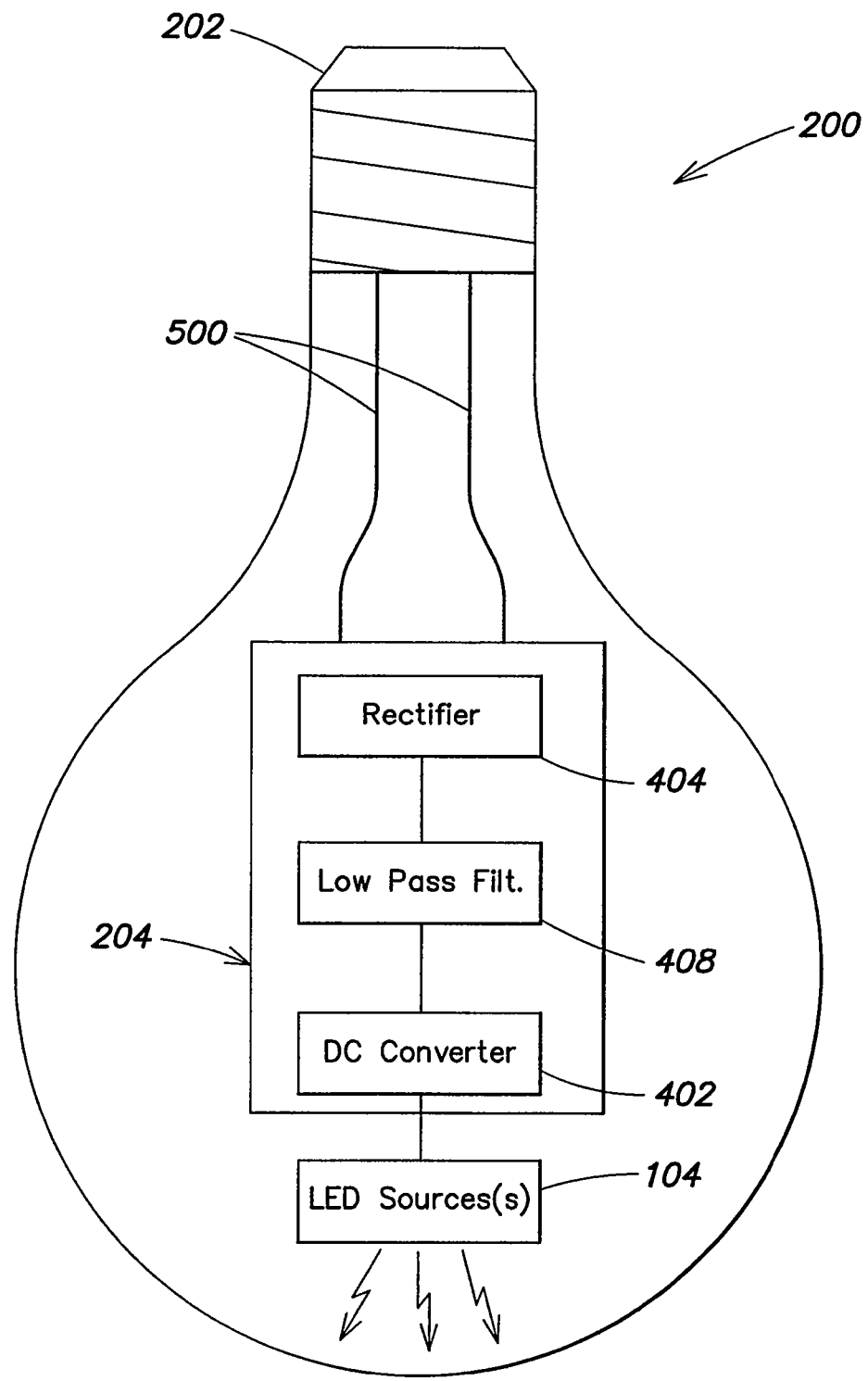
FIG. 3 illustrates a lighting unit including an LED-based light source according to one embodiment of the invention.

FIG. 3 illustrates an LED-based lighting unit 200 according to one embodiment of the present invention. For purposes of illustration, the lighting unit 200 is depicted generally to resemble a conventional incandescent light bulb having a screw-type base connector 202 to engage mechanically and electrically with a conventional light socket. It should be appreciated, however, that the invention is not limited in this respect, as a number of other configurations including other housing shapes and/or connector types are possible according to other embodiments. Various examples of power connector configurations include, but are not limited to, screw-type connectors, wedge-type connectors, multi-pin type connectors, and the like, to facilitate engagement with conventional incandescent, halogen, fluorescent or high intensity discharge (HID) type sockets. Such sockets, in turn, may be connected directly to a source of A.C. power (e.g., line voltage), or via a switch and/or dimmer to the source of A.C. power.

The lighting unit 200 of FIG. 3 includes an LED-based light source 104 having one or more LEDs. The lighting unit also includes a controller 204 that is configured to receive an A.C. signal 500 via the connector 202 and provide operating power to the LED-based light source 104. According to one aspect of this embodiment, the controller 204 includes various components to ensure proper operation of the lighting unit for A.C. signals 500 that are provided by a dimmer circuit and, more specifically, by a dimmer circuit that outputs duty cycle-controlled (i.e., angle modulated) A.C. signals as discussed above.

To this end, according to the embodiment of FIG. 3, the controller 204 includes a rectifier 404, a low pass (i.e., high frequency) filter 408 and a DC converter 402. In one aspect of this embodiment, the output of the DC converter 402 provides an essentially stable DC voltage as a power supply for the LED-based light source 104, regardless of user adjustments of the dimmer that provides the A.C. signal 500. More specifically, in this embodiment, the various components of the controller 204 facilitate operation of the lighting unit 200 on a dimmer circuit without providing for adjustment of the generated light based on dimmer operation; rather, the primary function of the controller 204 in the embodiment of FIG. 3 is to ensure that no damage is done to the LED-based light source based on deriving power from an A.C. dimmer circuit.

In particular, according to one aspect of this embodiment, an essentially constant DC power is provided to the LED-based light source as long as the dimmer circuit outputs an A.C. signal 500 that provides sufficient power to operate the controller 204. In one implementation, the dimmer circuit may output an A.C. signal 500 having a duty cycle of as low as 50% "on" (i.e., conducting) that provides sufficient power to cause light to be generated by the LED-based light source 104. In yet another implementation, the dimmer circuit may provide an A.C. signal 500 having a duty cycle of as low as 25% or less "on" that provides sufficient power to the light source 104. In this manner, user adjustment of the dimmer over a significantly wide range does not substantially affect the light output of the lighting unit 200. Again, the foregoing examples are provided primarily for purposes of illustration, as the invention is not necessarily limited in these respects.

Figure 4:
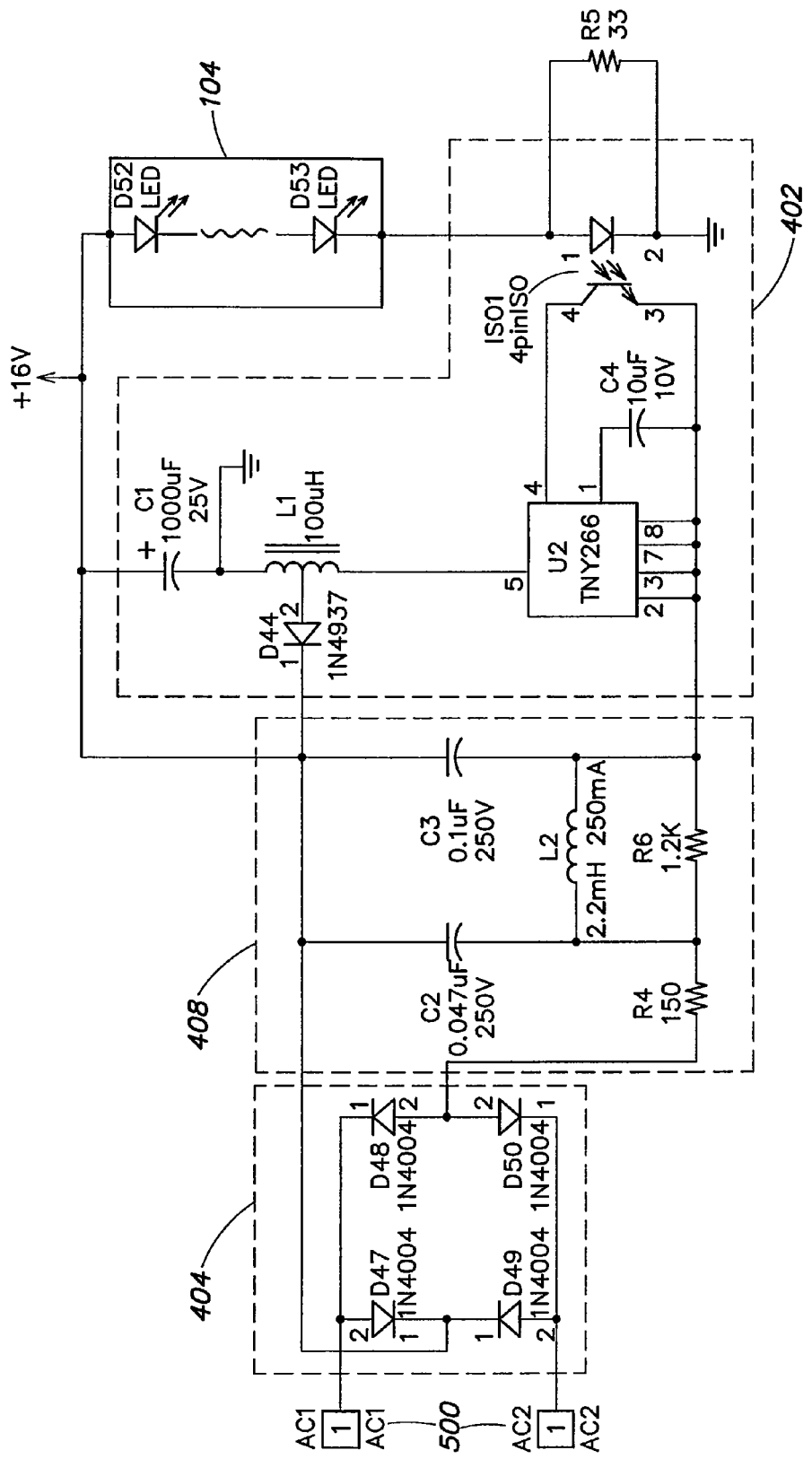
FIG. 4 is a circuit diagram illustrating various components of the lighting unit of FIG. 3, according to one embodiment of the invention.

FIG. 4 is an exemplary circuit diagram that illustrates some of the details of the various components shown in FIG. 3, according to one embodiment of the invention. Again, one of the primary functions of the circuitry depicted in FIG. 4 is to ensure safe operation of the LED-based light source 104 based on an A.C. signal 500 provided to the lighting unit 200 via a conventional A.C. dimmer circuit. As shown in FIG. 4, the rectifier 404 may be realized by a diode bridge (D47, D48, D49 and D50), while the low pass filter is realized from the various passive components (capacitors C2 and C3, inductor L2, and resistors R4 and R6) shown in the figure. In this embodiment, the DC converter 402 is realized in part using the integrated circuit model number TNY264/266 manufactured by Power Integrations, Inc., 5245 Hellyer Avenue, San Jose, Calif. 95138 (www.powerint.com), and is configured to provide a 16 VDC supply voltage to power the LED-based light source 104.

It should be appreciated that filter parameters (e.g., of the low pass filter shown in FIG. 4) are significantly important to ensure proper operation of the controller 204. In particular, the cutoff frequencies of the filter must be substantially less than a switching frequency of the DC converter, but substantially greater than the typical several cycle cutoff frequency employed in ordinary switch-mode power supplies. According to one implementation, the total input capacitance of the controller circuit is such that little energy remains in the capacitors at the conclusion of each half cycle of the AC waveform. The inductance similarly should be chosen to provide adequate isolation of the high frequency components created by the DC converter to meet regulatory requirements (under certain conditions this value may be zero). In yet other implementations, it may be advantageous to place all or part of the filter components ahead of the bridge rectifier 404.

The light source 104 of FIG. 4 may include one or more LEDs (as shown for example as the LEDs D52 and D53 in FIG. 4) having any of a variety of colors, and multiple LEDs may be configured in a variety of serial or parallel arrangements. Additionally, based on the particular configuration of the LED source 104, one or more resistors or other components may be used in serial and/or parallel arrangements with the LED source 104 to appropriately couple the source to the DC supply voltage.

Figure 5:
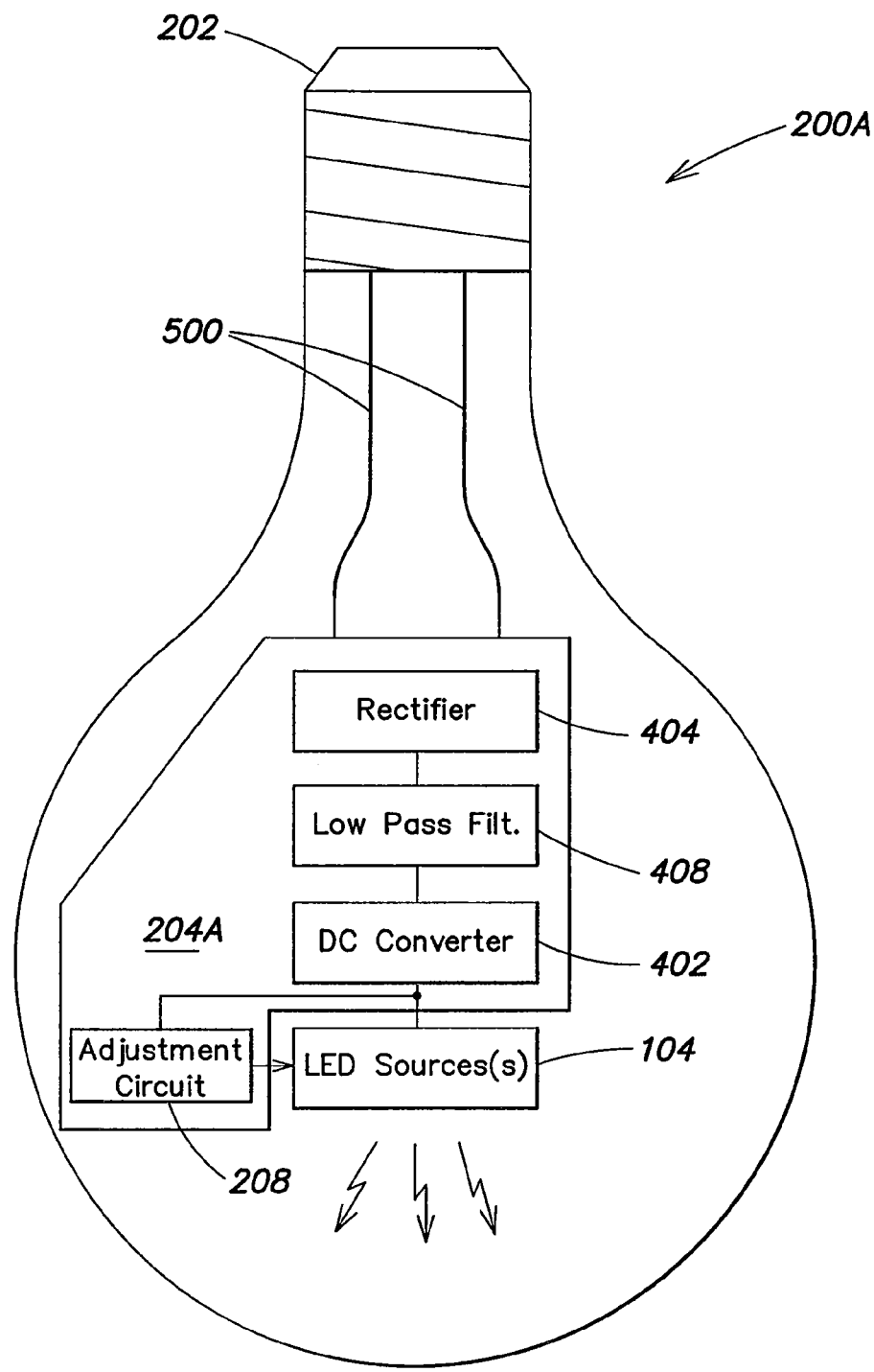
FIG. 5 illustrates a lighting unit including an LED-based light source according to another embodiment of the invention.

According to another embodiment of the invention, an LED-based light source not only may be safely powered by an A.C. dimmer circuit, but additionally the intensity of light generated by the light source may be adjusted via user operation of a dimmer that controls the A.C. signal provided by the dimmer circuit. FIG. 5 shows another example of a lighting unit 200A, similar to the lighting unit shown in FIG. 3, that is suitable for operation via a dimmer circuit. Unlike the lighting unit shown in FIG. 3, however, the lighting unit 200A of FIG. 5 is configured to have an adjustable light output that may be controlled via a dimmer. To this end, the controller 204A shown in FIG. 5 includes an additional adjustment circuit 208 that further conditions a signal output from the DC converter 402. The adjustment circuit 208 in turn provides a variable drive signal to the LED-based light source 104, based on variations in the A.C. signal 500 (e.g., variations in the average voltage of the signal) in response to user operation of the dimmer.

Figure 6:
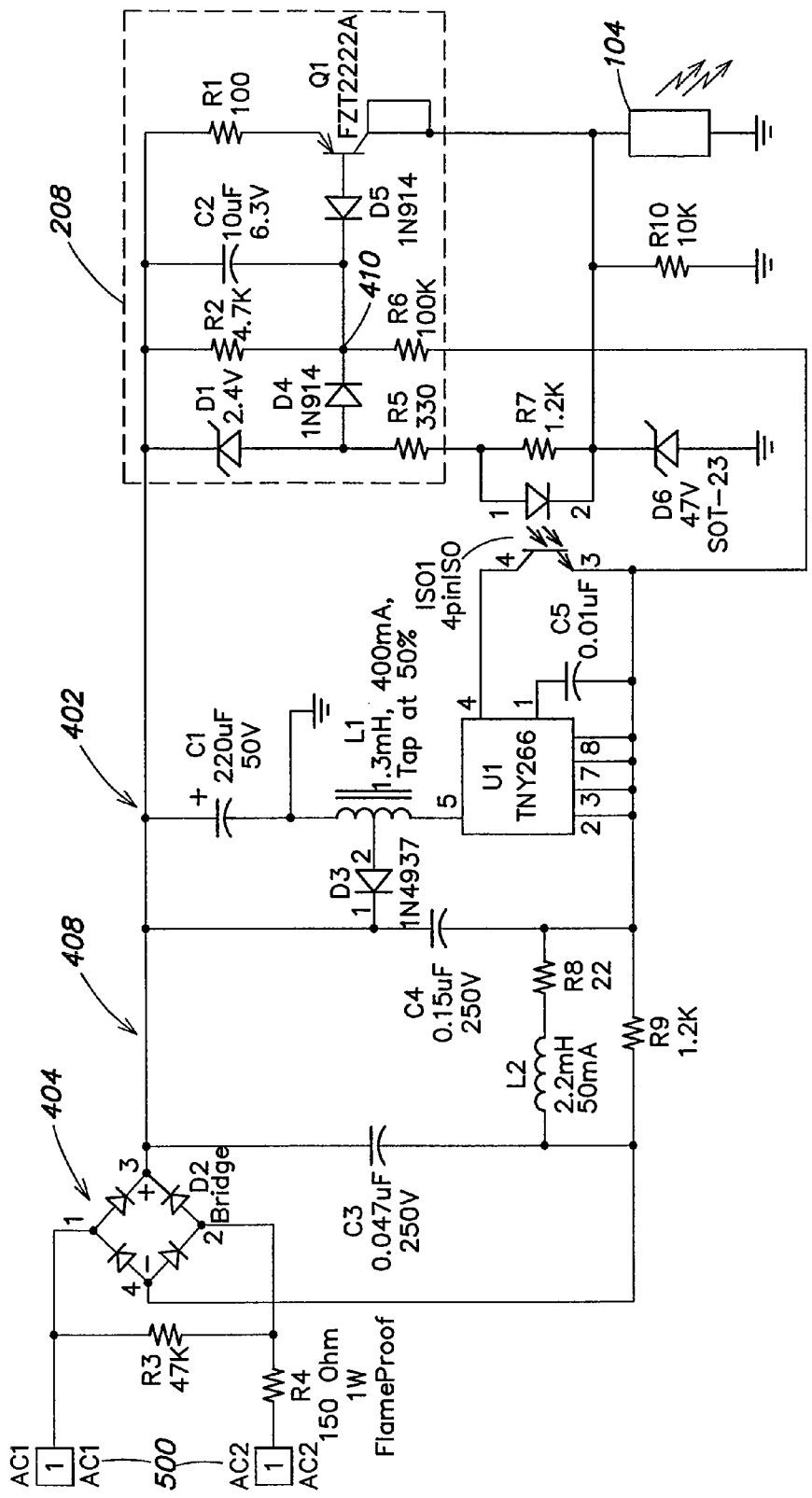
FIG. 6 is a circuit diagram illustrating various components of the lighting unit of FIG. 5, according to one embodiment of the invention.

FIG. 6 is an exemplary circuit diagram that illustrates some of the details of the various components shown in FIG. 5, according to one embodiment of the invention. Many of the circuit elements shown in FIG. 6 are similar or identical to those shown in FIG. 4. The additional adjustment circuit 208 is implemented in FIG. 6 in part by the resistors R2 and R6 which form a voltage divider in the feedback loop of the integrated circuit U1. A control voltage 410 is derived at the junction of the resistors R2 and R6, which control voltage varies in response to variations in the A.C. signal 500 due to dimmer operation. The control voltage 410 is applied via diode D5 to a voltage-to-current converter implemented by resistor R1 and transistor Q1, which provide a variable drive current to the LED-based light source 104 that tracks adjustments of the dimmer's user interface. In this manner, the intensity of the light generated by the light source 104 may be varied via the dimmer over a significant range of dimmer operation. Of course, it should be appreciated that if the dimmer is adjusted such that the A.C. signal 500 is no longer capable of providing adequate power to the associated circuitry, the light source 104 merely ceases to produce light.

It should be appreciated that in the circuit of FIG. 6, the control voltage 410 is essentially a filtered, scaled, maximum limited version of average DC voltage fed to the DC converter. This circuit relies on the DC converter to substantially discharge the input capacitors each half cycle. In practice this is easily achieved because input current to the controller stays fairly constant or increases as the duty cycle of the signal 500 is reduced, so long as device output does not decrease faster than the control voltage.

Processor-Based Exemplary Embodiments

According to other embodiments of the invention, an LED-based lighting unit suitable for operation via an A.C. dimmer circuit may be implemented using a processor-based controller. Below, an embodiment of an LED-based lighting unit including a processor is presented, including a discussion of how such a lighting unit may be particularly configured for operation via an A.C. dimmer circuit. For example, in addition to a microprocessor, such a processor-based lighting unit also may include, and/or receive signal(s) from, one or more other components associated with the microprocessor to facilitate the control of the generated light based at least in part on user adjustment of a conventional A.C. dimmer. Once a processor-based control scheme is implemented in a lighting unit according to the present invention, a virtually limitless number of configurations are possible for controlling the generated light.

Figure 7:
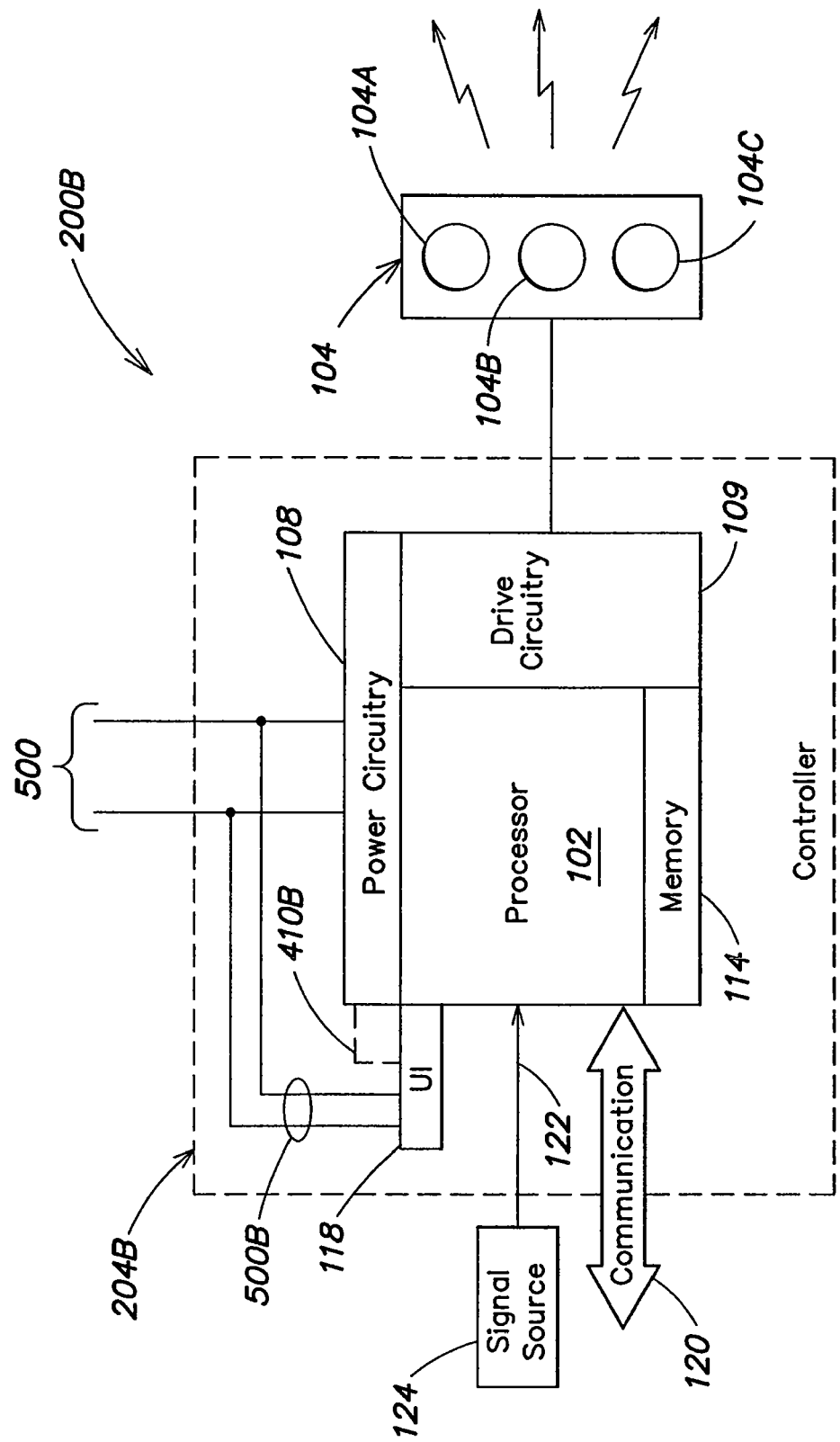
FIG. 7 is a block diagram of a processor-based lighting unit including an LED-based light source according to another embodiment of the invention.

FIG. 7 shows a portion of an LED-based lighting unit 200B that includes a processor-based controller 204B according to one embodiment of the invention. Various examples of processor controlled LED-based lighting units similar to that described below in connection with FIG. 7 may be found, for example, in U.S. Pat. No. 6,016,038, issued Jan. 18, 2000 to Mueller et al., entitled "Multicolored LED Lighting Method and Apparatus," and U.S. Pat. No. 6,211,626, issued Apr. 3, 2001 to Lys et al, entitled "Illumination Components," which patents are both hereby incorporated herein by reference.

In one aspect, while not shown explicitly in FIG. 7, the lighting unit 200B may include a housing structure that is configured similarly to the other lighting units shown in FIGS. 3 and 5 (i.e., as a replacement for an incandescent bulb having a conventional screw-type connector). Again, however, it should be appreciated that the invention is not limited in this respect; more generally, the lighting unit 200B may be implemented using any one of a variety of mounting arrangements for the light source(s), enclosure/housing arrangements and shapes to partially or fully enclose the light sources, and/or electrical and mechanical connection configurations.

As shown in FIG. 7, the lighting unit 200B includes one or more light sources 104A, 104B, and 104C (shown collectively as 104), wherein one or more of the light sources may be an LED-based light source that includes one or more light emitting diodes (LEDs). In one aspect of this embodiment, any two or more of the light sources 104A, 104B, and 104C may be adapted to generate radiation of different colors (e.g. red, green, and blue, respectively). Although FIG. 7 shows three light sources 104A, 104B, and 104C, it should be appreciated that the lighting unit is not limited in this respect, as different numbers and various types of light sources (all LED-based light sources, LED-based and non-LED-based light sources in combination, etc.) adapted to generate radiation of a variety of different colors, including essentially white light, may be employed in the lighting unit 200B, as discussed further below.

As shown in FIG. 7, the lighting unit 200B also may include a processor 102 that is configured to control drive circuitry 109 to drive the light sources 104A, 104B, and 104C so as to generate various intensities of light from the light sources. For example, in one implementation, the processor 102 may be configured to output via the drive circuitry 109 at least one control signal for each light source so as to independently control the intensity of light generated by each light source. Some examples of control signals that may be generated by the processor and drive circuitry to control the light sources include, but are not limited to, pulse modulated signals, pulse width modulated signals (PWM), pulse amplitude modulated signals (PAM), pulse code modulated signals (PCM) analog control signals (e.g., current control signals, voltage control signals), combinations and/or modulations of the foregoing signals, or other control signals.

In one implementation of the lighting unit 200B, one or more of the light sources 104A, 104B, and 104C shown in FIG. 7 may include a group of multiple LEDs or other types of light sources (e.g., various parallel and/or serial connections of LEDs or other types of light sources) that are controlled together by the processor 102. Additionally, it should be appreciated that one or more of the light sources 104A, 104B, and 104C may include one or more LEDs that are adapted to generate radiation having any of a variety of spectra (i.e., wavelengths or wavelength bands), including, but not limited to, various visible colors (including essentially white light), various color temperatures of white light, ultraviolet, or infrared. LEDs having a variety of spectral bandwidths (e.g., narrow band, broader band) may be employed in various implementations of the lighting unit 200B.

In another aspect of the lighting unit 200B shown in FIG. 7, the lighting unit may be constructed and arranged to produce a wide range of variable color radiation. For example, the lighting unit 200B may be particularly arranged such that the processor-controlled variable intensity light generated by two or more of the light sources combines to produce a mixed colored light (including essentially white light having a variety of color temperatures). In particular, the color (or color temperature) of the mixed colored light may be varied by varying one or more of the respective intensities of the light sources (e.g., in response to one or more control signals output by the processor and drive circuitry). Furthermore, the processor 102 may be particularly configured (e.g., programmed) to provide control signals to one or more of the light sources so as to generate a variety of static or time-varying (dynamic) multi-color (or multi-color temperature) lighting effects.

Thus, the lighting unit 200B may include a wide variety of colors of LEDs in various combinations, including two or more of red, green, and blue LEDs to produce a color mix, as well as one or more other LEDs to create varying colors and color temperatures of white light. For example, red, green and blue can be mixed with amber, white, UV, orange, IR or other colors of LEDs. Such combinations of differently colored LEDs in the lighting unit 200B can facilitate accurate reproduction of a host of desirable spectrums of lighting conditions, examples of which includes, but are not limited to, a variety of outside daylight equivalents at different times of the day, various interior lighting conditions, lighting conditions to simulate a complex multicolored background, and the like. Other desirable lighting conditions can be created by removing particular pieces of spectrum that may be specifically absorbed, attenuated or reflected in certain environments.

As shown in FIG. 7, the lighting unit 200B also may include a memory 114 to store various information. For example, the memory 114 may be employed to store one or more lighting programs for execution by the processor 102 (e.g., to generate one or more control signals for the light sources), as well as various types of data useful for generating variable color radiation (e.g., calibration information). The memory 114 also may store one or more particular identifiers (e.g., a serial number, an address, etc.) that may be used either locally or on a system level to identify the lighting unit 200B. In various embodiments, such identifiers may be pre-programmed by a manufacturer, for example, and may be either alterable or non-alterable thereafter (e.g., via some type of user interface located on the lighting unit, via one or more data or control signals received by the lighting unit, etc.). Alternatively, such identifiers may be determined at the time of initial use of the lighting unit in the field, and again may be alterable or non-alterable thereafter.

In another aspect, as also shown in FIG. 7, the lighting unit 200B optionally may be configured to receive a user interface signal 118 that is provided to facilitate any of a number of user-selectable settings or functions (e.g., generally controlling the light output of the lighting unit 200B, changing and/or selecting various pre-programmed lighting effects to be generated by the lighting unit, changing and/or selecting various parameters of selected lighting effects, setting particular identifiers such as addresses or serial numbers for the lighting unit, etc.). In one embodiment of the invention discussed further below, the user interface signal 118 may be derived from an A.C. signal provided by a dimmer circuit and/or other control signal(s) on an A.C. power circuit, so that the light generated by the light source 104 may be controlled in response to dimmer operation and/or the other control signal(s).

More generally, in one aspect of the embodiment shown in FIG. 7, the processor 102 of the lighting unit 200B is configured to monitor the user interface signal 118 and control one or more of the light sources 104A, 104B, and 104C based at least in part on the user interface signal. For example, the processor 102 may be configured to respond to the user interface signal by originating one or more control signals (e.g., via the drive circuitry 109) for controlling one or more of the light sources. Alternatively, the processor 102 may be configured to respond by selecting one or more pre-programmed control signals stored in memory, modifying control signals generated by executing a lighting program, selecting and executing a new lighting program from memory, or otherwise affecting the radiation generated by one or more of the light sources.

To this end, the processor 102 may be configured to use any one or more of several criteria to "evaluate" the user interface signal 118 and perform one or more functions in response to the user interface signal. For example, the processor 102 may be configured to take some action based on a particular instantaneous value of the user interface signal, a change of some characteristic of the user interface signal, a rate of change of some characteristic of the user interface signal, a time averaged value of some characteristic of the user interface signal, periodic patterns or interruptions of the user interface signal having particular durations, zero-crossings of an A.C. user interface signal, etc.

In one embodiment, the processor is configured to digitally sample the user interface signal 118 and process the samples according to some predetermined criteria to determine if one or more functions need to be performed. In yet another embodiment, the memory 114 associated with the processor 102 may include one or more tables or, more generally, a database, that provides a mapping of values relating to the user interface signal to values for various control signals used to control the LED-based light source 104 (e.g., a particular value or condition associated with the user interface signal may correspond to particular duty cycles of PWM signals respectively applied to differently colored LEDs of the light source). In this manner, a wide variety of lighting control functions may be performed based on the user interface signal.

FIG. 7 also illustrates that the lighting unit 200B may be configured to receive one or more signals 122 from one or more other signal sources 124. In one implementation, the processor 102 of the lighting unit may use the signal(s) 122, either alone or in combination with other control signals (e.g., signals generated by executing a lighting program, user interface signals, etc.), so as to control one or more of the light sources 104A, 104B and 104C in a manner similar to that discussed above in connection with the user interface. Some examples of a signal source 124 that may be employed in, or used in connection with, the lighting unit 200B of FIG. 7 include any of a variety of sensors or transducers that generate one or more signals 122 in response to some stimulus. Examples of such sensors include, but are not limited to, various types of environmental condition sensors, such as thermally sensitive (e.g., temperature, infrared) sensors, humidity sensors, motion sensors, photosensors/ light sensors (e.g., sensors that are sensitive to one or more particular spectra of electromagnetic radiation), various types of cameras, sound or vibration sensors or other pressure/force transducers (e.g., microphones, piezoelectric devices), and the like.

As also shown in FIG. 7, the lighting unit 200B may include one or more communication ports 120 to facilitate coupling of the lighting unit to any of a variety of other devices. For example, one or more communication ports 120 may facilitate coupling multiple lighting units together as a networked lighting system, in which at least some of the lighting units are addressable (e.g., have particular identifiers or addresses) and are responsive to particular data transported across the network.

In particular, in a networked lighting system environment, as data is communicated via the network, the processor 102 of each lighting unit coupled to the network may be configured to be responsive to particular data (e.g., lighting control commands) that pertain to it (e.g., in some cases, as dictated by the respective identifiers of the networked lighting units). Once a given processor identifies particular data intended for it, it may read the data and, for example, change the lighting conditions produced by its light sources according to the received data (e.g., by generating appropriate control signals to the light sources). In one aspect, the memory 114 of each lighting unit coupled to the network may be loaded, for example, with a table of lighting control signals that correspond with data the processor 102 receives. Once the processor 102 receives data from the network, the processor may consult the table to select the control signals that correspond to the received data, and control the light sources of the lighting unit accordingly.

In one aspect of this embodiment, the processor 102 of a given lighting unit, whether or not coupled to a network, may be configured to interpret lighting instructions/data that are received in a DMX protocol (as discussed, for example, in U.S. Pat. Nos. 6,016,038 and 6,211,626), which is a lighting command protocol conventionally employed in the lighting industry for some programmable lighting applications. However, it should be appreciated that lighting units suitable for purposes of the present invention are not limited in this respect, as lighting units according to various embodiments may be configured to be responsive to other types of communication protocols so as to control their respective light sources.

Figure 8:
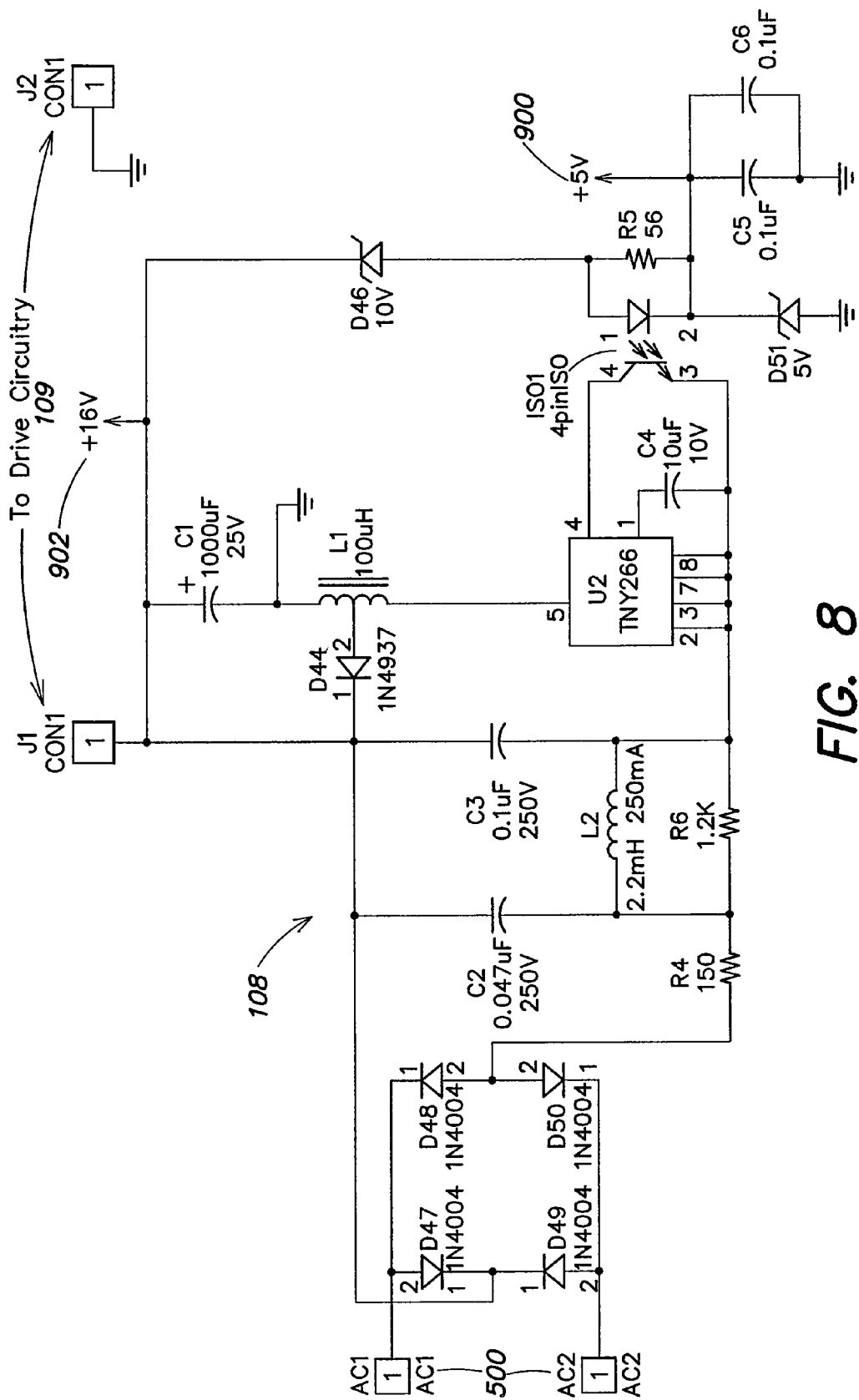
FIG. 8 is a circuit diagram illustrating various components of the power circuitry for the lighting unit of FIG. 7.

The lighting unit 200B of FIG. 7 also includes power circuitry 108 that is configured to derive power for the lighting unit based on an A.C. signal 500 (e.g., a line voltage, a signal provided by a dimmer circuit, etc.). In one implementation of the lighting unit 200B, the power circuitry 108 may be configured similarly to portions of the circuits shown in FIGS. 4 and 6, for example. In particular, FIG. 8 illustrates one exemplary circuit arrangement for the power circuitry 108, based on several of the elements shown in FIGS. 4 and 6, that may be employed in one implementation of the lighting unit 200B. In the circuit shown in FIG. 8, a 5 Volt DC output 900 is provided for at least the processor 102, whereas a 16 Volt DC output 902 is provided for the drive circuitry 109, which ultimately provides power to the LED-based light source 104. Like the circuits shown in FIGS. 4 and 6, it should be appreciated that as the overall power provided by the A.C. signal 500 is reduced due to operation of a dimmer, for example, at some point the power circuitry 108 will be unable to provide sufficient power to the various components of the lighting unit 200B and it will cease to generate light. Nonetheless, in one aspect, the power circuitry 108 is configured to provide sufficient power to the lighting unit over a significant range of dimmer operation.

According to another embodiment of the invention, the power circuitry 108 shown in FIG. 8 may be modified to also provide a control signal that reflects variations in the A.C. signal 500 (e.g., changes in the average voltage) in response to dimmer operation. For example, the circuit of FIG. 8 may be modified to include additional components similar to those shown in connection with the adjustment circuit 208 of FIG. 6 which provide the control voltage 410 (e.g., a resistor divider network in the opto-isolator feedback loop). A control signal similarly derived from the circuit of FIG. 8 may serve as the user interface signal 118 applied to the processor 102, as indicated by the dashed line 410B shown in FIG. 7. In other embodiments, the circuit of FIG. 8 may be modified so as to derive a control/user interface signal from other portions of the circuitry, such as an output of the rectifier or low pass filter, for example.

In yet another embodiment, the user interface signal 118 provided to the processor 102 may be the A.C. signal 500 itself, as indicated in FIG. 7 by the connections 500B. In this embodiment, the processor 102 may be particularly programmed to digitally sample the A.C. signal 500 and detect changes in one or more characteristics of the A.C. signal (e.g., amplitude variations, degree of angle modulation, etc.). In this manner, rather than respond to a control signal that is derived based on variations of an average voltage of the A.C. signal 500 due to dimmer operation, the processor may respond to dimmer operation by "more directly" monitoring some characteristic (e.g., the degree of angle modulation) of the A.C. dimmer output signal. A number of techniques readily apparent to those skilled in the art, some of which were discussed above in connection with the user interface signal 118, may be similarly implemented by the processor to sample and process the A.C. signal 500.

Once a user interface signal 118 that represents dimmer operation is derived using any of the techniques discussed above (or other techniques), the processor 102 may be programmed to implement any of a virtually limitless variety of light control functions based on user adjustment of the dimmer. For example, user adjustment of a dimmer may cause the processor to change one or more of the intensity, color, correlated color temperature, or temporal qualities of the light generated by the lighting unit 200B.

To more specifically illustrate the foregoing, consider the lighting unit 200B configured with two lighting programs stored in the memory 114; the first lighting program is configured to allow adjustment of the overall color of the generated light in response to dimmer operation, and the second lighting program is configured to allow adjustment of the overall intensity of the generated light, at a given color, in response to dimmer operation. Moreover, the processor is programmed such that a particular type of dimmer operation toggles between the two programs, and such that on initial power-up, one of the two programs (e.g., the first program) is automatically executed as a default.

In this example, on power up, the first program (e.g., adjustable color) begins executing, and a user may change the overall color of the generated light by operating the dimmer user interface in a "normal" fashion over some range of adjustment (e.g., the color may be varied through a rainbow of colors from red to blue with gradual adjustment of the dimmer's user interface).

Once arriving at a desirable color, the user may then select the second program (e.g., adjustable intensity) for execution by operating the dimmer user interface in some particular predetermined manner (e.g., instantaneously interrupting the power for a predetermined period via an on/off switch incorporated with the dimmer, adjusting the dimmer's user interface at a quick rate, etc.). As discussed above in connection with user interface signal concepts, any number of criteria may be used to evaluate dimmer operation and determine if a new program selection is desired, or if adjustment of a currently executing program is desired. Various examples of program or mode selection via a user interface, as well as parameter adjustment within a selected program or mode, are discussed in U.S. Non-provisional Application Ser. No. 09/805,368 and U.S. Non-provisional Application Ser. No. 10/045,629, incorporated herein by reference.

In this example, once the second program begins to execute, the user may change the intensity of the generated light (at the previously adjusted color) by subsequent "normal" operation (e.g., gradual adjustment) of the dimmer's user interface. Using the foregoing exemplary procedure, the user may adjust both the intensity and the color of the light emitted from the lighting unit via a conventional A.C. dimmer.

It should be appreciated that the foregoing example is provided primarily for purposes of illustration, and that the invention is not limited in these respects. In general, according to various embodiments of the invention, multiple parameters relating to the generated light may be changed in sequence, or simultaneously in combination. Also, via selection and execution of a lighting program, temporal characteristics of the generated light also may be adjusted (e.g., rate of strobing of a given color, rate of change of a rainbow wash of colors, etc.).

For example, in one embodiment, an LED-based light source coupled to an A.C. dimmer circuit may be configured to essentially recreate the lighting characteristics of a conventional incandescent light as a dimmer is operated to increase or decrease the intensity of the generated light. In one aspect of this embodiment, this simulation may be accomplished by simultaneously varying the intensity and the color of the light generated by the LED-based source via dimmer operation.

More specifically, in conventional incandescent light sources, the color temperature of the light emitted generally reduces as the power dissipated by the light source is reduced (e.g., at lower intensity levels, the correlated color temperature of the light produced may be near 2000 K, while the correlated color temperature of the light at higher intensities may be near 3200 K). This is why an incandescent light tends to appear redder as the power to the light source is reduced. Accordingly, in one embodiment, an LED-based lighting unit may be configured such that a single dimmer adjustment may be used to simultaneously change both the intensity and color of the light source so as to produce a relatively high correlated color temperature at higher intensities (e.g. when the dimmer provides essentially "full" power) and produce lower correlated color temperatures at lower intensities, so as to mimic an incandescent source.

Another embodiment of the present invention is directed to a flame simulation control system, or other simulation control system. The system may include an LED-based light source or lighting unit arranged to produce flame effects or simulations. Such a flame simulation system may be used to replace more conventional flame simulation systems (e.g. incandescent or neon). The flame simulation lighting device may be configured (e.g., include a lighting program) for altering the appearance of the generated light to simulate wind blowing through the flame or random flickering effects to make the simulation more realistic. Such a simulation system may be associated with a user interface to control the effects, and also may be configured to be adapted for use and/or controlled via an A.C. dimmer circuit (e.g., a dimmer control system may be used to change the effects of the simulation system). In other implementations, the user interface may communicate to the simulation device through wired or wireless communication and a user may be able to alter the effects of the device through the user interface. The simulation device may include an effect that can be modified for rate of change, intensity, color, flicker rate, to simulate windy conditions, still conditions, moderate conditions or any other desirable modification.

Many lighting control systems do not include dimmer circuits where dimming and other alterable lighting effects would be desirable. Accordingly, yet another embodiment of the present invention is directed to a lighting effect control system including a wireless control system. According to this embodiment, an LED-based light source or lighting unit may be adapted to receive wireless communications to effect lighting changes in the lighting system (e.g., see FIG. 7 in connection with communication link 120). A wireless transmitter may be used by a user to change the lighting effects generated by the lighting system. In one implementation, the transmitter is associated with a power switch for the control system. For example, the power switch may be a wall mounted power switch and a user interface may be associated with the wall-mounted switch. The user interface may be used to generate wireless communication signals that are communicated to the lighting system to cause a change in the light emitted. In another embodiment, the signals are communicated to the lighting system over the power wires in a multiplexed fashion where the light decodes the data from the power.

Yet another embodiment of the invention is directed to methods and apparatus for communicating control information to one or more lighting devices, as well as other devices that typically are powered via a standard A.C. line voltage, by using a portion of the duty cycle of the line voltage to communicate the control information. For example, according to one embodiment, a supply voltage controller is configured to receive a standard A.C. line voltage as an input, and provide as an output a power signal including control information. The power signal provides an essentially constant A.C. power source; however, according to one aspect of this embodiment, the signal periodically is "interrupted" (e.g., a portion of the AC duty cycle over a period of cycles is removed) to provide one or more communication channels over which control information (e.g., digitally encoded information) may be transmitted to one or more devices coupled to the power signal. The device(s) coupled to the power signal may be particularly configured to be responsive in some way to such control information.

For example, it should be appreciated that the various LED-based lighting units disclosed herein, having the capability to provide power to LED-based light sources from a standard A.C. line voltage, an A.C. dimmer circuit (e.g., providing an angle modulated power source), or from a power source in which other control signals may be present in connection with an A.C. line voltage, may be particularly configured to be compatible with the power signal described above and responsive to the control information transmitted over the communication channel.

According to one aspect of this embodiment, a supply voltage controller to provide a power signal as discussed above may be implemented as a processor-based user interface, including any number of features (e.g., buttons, dials, sliders, etc.) to facilitate user operation of the controller. In particular, in one implementation, the supply voltage controller may be implemented to resemble a conventional dimmer (e.g., having a knob or a slider as a user interface), in which an associated processor is particularly programmed to monitor operation of the user interface and generate control information in response to such operation. The processor also is programmed to transmit the control information via one or more communication channels of the power signal, as discussed above.

In other aspects of this embodiment, unlike currently available home control networks/systems such as X10, the device(s) being controlled by the power signal essentially are defined by the electrical wiring that provides the power signal, rather than by programming or addresses assigned to the device(s). Additionally, other "non-controllable" devices (i.e., not configured to be responsive to the control information transported on the power signal) may be coupled to the power signal without any detrimental effect, and allow for a mix of controllable and non-controllable devices on the same power circuit (i.e., delivering the same power signal to all devices on the circuit). Moreover, devices in different wiring domains (i.e., on different power circuits) are guaranteed through topology not to interfere with, or be responsive to, the power signal on a particular power circuit. In yet another aspect, the power signal of this embodiment is essentially "transparent" to (i.e., does not interfere with) other protocols such as X10.

In one exemplary implementation based on a supply voltage controller providing a power signal as discussed above on a given power circuit, a number of lighting devices (e.g., conventional lighting devices, LED-based lighting units, etc) may be coupled to the power circuit and configured such that they are essentially non-responsive to any control information transmitted on the power circuit. For example, the "non-responsive" lighting devices may be conventional incandescent light sources or other devices that receive power via the portion of the power signal that does not include the communication channel. These lighting devices may serve in a given environment to provide general illumination in the environment.

In addition to the non-responsive lighting devices in this example, one or more other controllable lighting devices (e.g., particularly configured LED-based lighting units) also may be coupled to the same power circuit and configured to be responsive to the control information in the communication channel of the power signal (i.e., responsive to user operation of the supply voltage controller). In this manner, the controllable lighting device(s) may provide various types of accent/special effects lighting to complement the general illumination provided by the other "non-responsive" devices on the same power circuit.

Exemplary Drive Circuit Embodiments

With reference again to FIG. 7, the drive circuitry 109 of the lighting unit 200B may be implemented in numerous ways, one of which employs one or more current drivers respectively corresponding to the one or more light sources 104A, 104B and 104C (collectively 104). In particular, according to one embodiment, the drive circuitry 109 is configured such that each differently colored light source is associated with a voltage to current converter that receives a voltage control signal (e.g., a digital PWM signal) from the processor 102 and provides a corresponding current to energize the light source. Such a driver circuit is not limited to implementations of lighting units that are particularly configured for operation via an A.C. dimmer circuit; more generally, lighting units similar to the lighting unit 200B and configured for use with various types of power sources (e.g., A.C. line voltages, A.C. dimmer circuits, D.C. power sources) may employ driver circuitry including one or more voltage to current converters.

Figure 9:
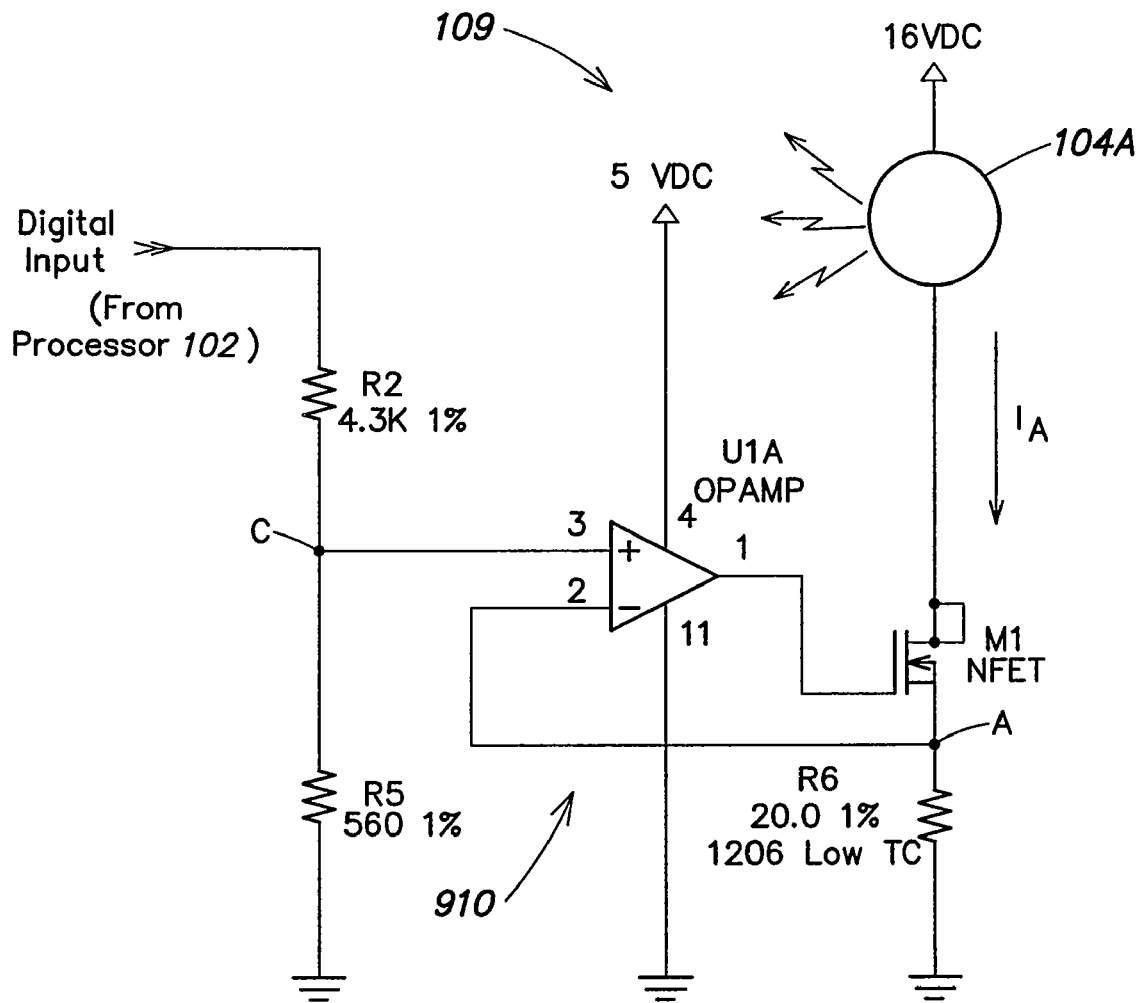
FIG. 9 is a circuit diagram illustrating a conventional current sink employed in driving circuitry for an LED-based light source, according to one embodiment of the invention.

FIG. 9 illustrates one example of a portion of the driver circuitry 109 employing a conventional voltage to current converter, also referred to as a "current sink" 910. As shown in FIG. 9, the current sink 910 receives a digital input control signal from the processor 102 and provides a current $I_A$ to drive the light source 104A. It should be appreciated that, according to one embodiment, multiple light sources are included in the lighting unit, and that the driver circuitry 109 includes circuitry similar to that shown in FIG. 9 for each light source (wherein the processor provides one control signal for each current sink).

The current sink 910 illustrated in FIG. 9 is widely used for control of current in various applications, and is discussed in many popular textbooks (e.g., see Intuitive IC OPAMPS, Thomas M. Frederiksen, 1984, pages 186-189). The operational amplifier based current sink of FIG. 9 functions to maintain the voltage at the node "A" (i.e., across the resistor R6) and the "reference" voltage at the node "C" (at the non-inverting input of the operational amplifier U1A) at the same value. In this manner, the light source current $I_A$ is related to (i.e., tracks) the digital control signal provided by the processor 102.

The reference voltage at the point "C" in FIG. 9 may be developed in a variety of ways, and the Frederiksen text referenced above suggests that a resistor divider (e.g., R2 and R5) is a good method of creating this voltage. Generally, the reference voltage is chosen by a designer of the circuit as a compromise; on one hand, the voltage should be as low as possible, to reduce the burden voltage (i.e. the lowest voltage at which the current $I_A$ is maintained) of the current sink. On the other hand, lowering the reference voltage increases the circuit error, due to various sources, including: 1) the offset voltage of the op-amp; 2) differences in the input bias currents of the op-amp; 3) poor tolerances of low value resistors; and 4) errors in sensing small voltages due to voltage drops across component interconnections. Lowering the reference voltage also decreases the speed of the circuit, because feedback to the op-amp is reduced. This situation can also lead to instabilities in the circuit.

The reference voltage at the point "C" in FIG. 9 need not be constant, and it may be switched between any desired voltages to generate different currents. In particular, a pulse width modulated (PWM) digital control voltage may be applied to the circuit from the processor 102, to generate a switched current $I_A$. Through careful selection of resistor values for the voltage divider formed by resistors R2 and R5, various circuit goals may be achieved, including the matching of op-amp bias currents.

One issue with the circuit shown in FIG. 9 is that when the digital control signal from the processor is not present or off (e.g., at zero volts), the operational amplifier U1A may not turn the transistor M1 fully off. As a result, some current $I_A$ may still flow through the light source 104A, even though the light source is intended to be off. In view of the foregoing, one embodiment of the present invention is directed to drive circuitry for LED-based light sources that incorporates an improved current sink design to ensure more accurate control of the light sources.

Figure 10:
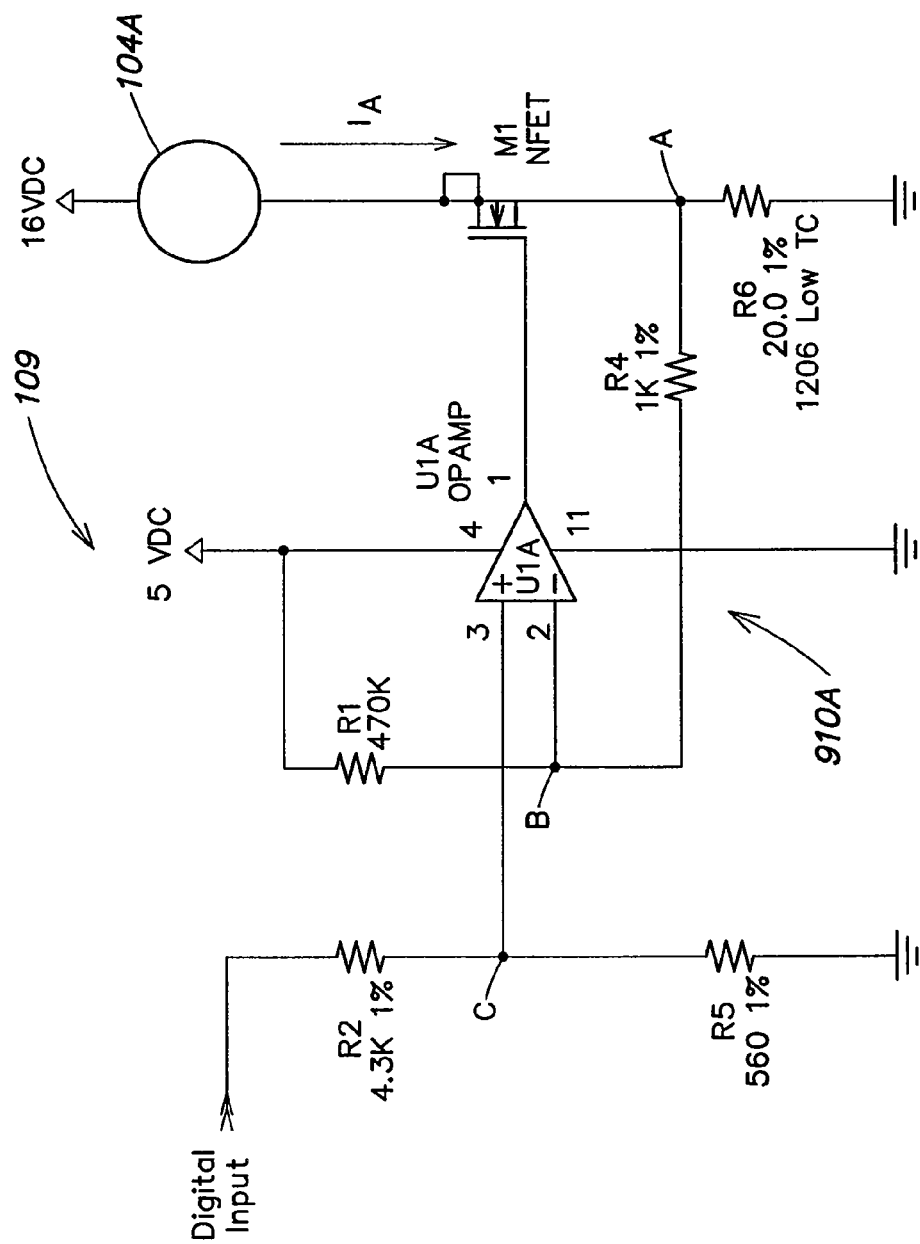
FIG. 10 is a circuit diagram illustrating an improved current sink, according to one embodiment of the invention.

FIG. 10 illustrates one example of such an improved current sink 910A according to one embodiment of the invention. The current sink 910A is configured such that there is a known "error voltage" at the node "B" (e.g., the inverting input of the operational amplifier U1A), through the use of resistors R4 and R1. In particular, the values of resistors R4 and R1 are selected so as to slightly increase the voltage at the node "B" as compared to the arrangement shown in FIG. 9. As a result, when the reference voltage at the node "C" is zero (i.e., when the digital control signal is such that the light source 104A is intended to be off), the voltage at the node "B" is slightly above that at the node "C". This voltage difference forces the op-amp to drive its output low, which hence drives transistor M1 well into its "off" region and avoids any inadvertent flow of the current $I_A$.

The small known error voltage introduced at the node "B" does not necessarily result in any increase in current error. In one embodiment, the values of resistors R2 and R5 may be adjusted to compensate for the effects of the error voltage. For example, resistors R4 and R1 may be selected to result in 20 mV at the node "B" when the node "C" is at zero volts (such that the OPAMP is in the "off" state). In the "on" state, the circuit may be configured such that there is approximately 5 mV of sense voltage at the node "A" (across the resistor R6). The error voltage is added to the desired sense resistor voltage, and the values of resistors R2 and R5 are appropriately selected to result in a 25 mV reference voltage at the node "C" in the presence of a digital control signal indicating an "on" state. In one embodiment, the circuit may be configured such that the output current $I_A$ and sense voltage at node "A" may be much greater than the minimums, for various reasons, but most notably because lower cost op-amps may be used to achieve 1% accuracy if the sense voltage is increased to the 300-700 mV range.

Figure 11:
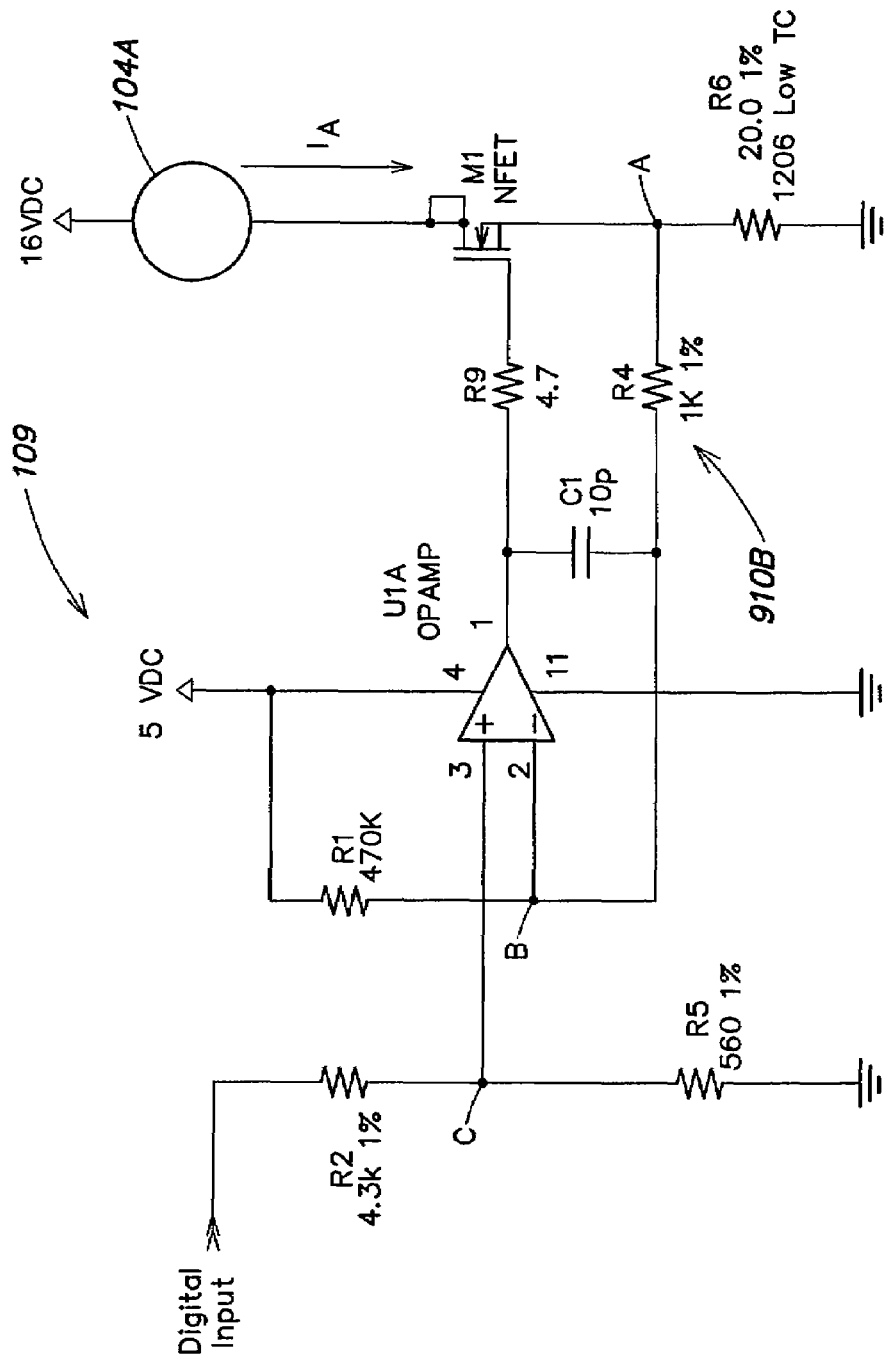
FIG. 11 is a circuit diagram illustrating an improved current sink, according to another embodiment of the invention.

FIG. 11 shows yet another embodiment of a current sink 910B, in which several optional components are added to the circuit of FIG. 10, which increase the speed and current capability of the circuit. In particular, as the size of transistor M1 is increased towards larger currents, capacitor C1 and resistor R3 may be added to compensate for the larger capacitance of M1. This capacitance presents a large load to the op-amp, and for many op-amp designs, this can cause instability. Resistor R3 lowers the apparent load presented by M1, and C1 provides a high frequency feedback path for the op-amp, which bypasses M1. In one aspect of this embodiment, the circuit impedance at nodes "B" and "C" may be matched, to reduce the effects of op-amp bias current. In another embodiment this matching may be avoided by using modern FET input op-amps.

Having thus described several illustrative embodiments of the invention, various alterations, modifications, and improvements will readily occur to those skilled in the art. Such alterations, modifications, and improvements are intended to be within the spirit and scope of the invention. While some examples presented herein involve specific combinations of functions or structural elements, it should be understood that those functions and elements may be combined in other ways according to the present invention to accomplish the same or different objectives. In particular, acts, elements and features discussed in connection with one embodiment are not intended to be excluded from a similar or other roles in other embodiments. Accordingly, the foregoing description is by way of example only, and is not intended as limiting.

The invention claimed is:

1. An illumination apparatus, comprising:
   at least one LED; and
   at least one controller coupled to the at least one LED and configured to receive a power-related signal from an alternating current (A.C.) power source that provides signals other than a standard A.C. line voltage, the at least one controller further configured to provide power to the at least one LED based on the power-related signal.

2. The apparatus of claim 1, wherein the A.C. power source is an (A.C.) dimmer circuit.

3. The apparatus of claim 2, wherein the A.C. dimmer circuit is controlled by a user interface to vary the power-related signal, and wherein the at least one controller is configured to provide an essentially non-varying power to the at least one LED over a significant range of operation of the user interface.

4. The apparatus of claim 3, wherein the operation of the user interface varies a duty cycle of the power-related signal, and wherein the at least one controller is configured to provide the essentially non-varying power to the at least one LED over a significant range of operation of the user interface notwithstanding variations in the duty cycle of the power-related signal.

5. The apparatus of claim 3, wherein the at least one controller comprises:
a rectifier to receive the power-related signal and provide a rectified power-related signal;
a low pass filter to filter the rectified power-related signal; and
a DC converter to provide the essentially non-varying power based on the filtered rectified power-related signal.

6. The apparatus of claim 3, further comprising:
a screw-type power connector configured to engage mechanically and electrically with a conventional incandescent light socket so as to couple the apparatus to the A.C. dimmer circuit.

7. The apparatus of claim 6, further comprising:
a housing, coupled to the screw-type power connector, to enclose the at least one LED and the at least one controller, the housing being structurally configured to resemble an incandescent light bulb.

8. The apparatus of claim 7, wherein the at least one LED includes a plurality of differently colored LEDs.

9. The apparatus of claim 2, wherein the A.C. dimmer circuit is controlled by a user interface to vary the power-related signal, and wherein the at least one controller is configured to variably control at least one parameter of light generated by the at least one LED in response to operation of the user interface.

10. The apparatus of claim 9, wherein the operation of the user interface varies a duty cycle of the power-related signal, and wherein the at least one controller is configured to variably control the at least one parameter of the light based at least on the variable duty cycle of the power-related signal.

11. The apparatus of claim 9, wherein the at least one parameter of the light that is variably controlled by the at least one controller in response to operation of the user interface includes at least one of an intensity of the light, a color of the light, a color temperature of the light, and a temporal characteristic of the light.

12. The apparatus of claim 9, wherein the at least one controller is configured to variably control at least two different parameters of the light generated by the at least one LED in response to operation of the user interface.

13. The apparatus of claim 12, wherein the at least one controller is configured to variably control at least an intensity and a color of the light simultaneously in response to operation of the user interface.

14. The apparatus of claim 12, wherein the at least one LED is configured to generate an essentially white light, and wherein the at least one controller is configured to variably control at least an intensity and a color temperature of the white light simultaneously in response to operation of the user interface.

15. The apparatus of claim 14, wherein the at least one controller is configured to variably control at least the intensity and the color temperature of the essentially white light in response to operation of the user interface so as to approximate light generation characteristics of an incandescent light source.

16. The apparatus of claim 15, wherein the at least one controller is configured to variably control the color temperature of the essentially white light over a range from approximately 2000 degrees K at a minimum intensity to 3200 degrees K at a maximum intensity.

17. The apparatus of claim 15, further comprising:
a screw-type power connector configured to engage mechanically and electrically with a conventional incandescent light socket so as to couple the apparatus to the A.C. dimmer circuit.

18. The apparatus of claim 17, further comprising:
a housing, coupled to the screw-type power connector, to enclose the at least one LED and the at least one controller, the housing being structurally configured to resemble an incandescent light bulb.

19. The apparatus of claim 15, wherein the at least one LED includes a plurality of differently colored LEDs.

20. The apparatus of claim 9, wherein the at least one controller includes:
an adjustment circuit to variably control the at least one parameter of light based on the varying power-related signal; and
power circuitry to provide at least the power to the at least one LED based on the varying power-related signal.

21. The apparatus of claim 20, wherein the power circuitry includes:
a rectifier to receive the power-related signal and provide a rectified power-related signal;
a low pass filter to filter the rectified power-related signal; and
a DC converter to provide the power to at least the at least one LED based on the filtered rectified power-related signal.

22. The apparatus of claim 21, wherein the adjustment circuit is coupled to the DC converter and is configured to variably control the at least one LED based on the filtered rectified power-related signal.

23. The apparatus of claim 21, wherein the adjustment circuit includes at least one processor configured to monitor at least one of the power-related signal, the rectified power-related signal, and the filtered rectified power-related signal so as to variably control the at least one LED.

24. The apparatus of claim 23, wherein the power circuitry is configured to provide at least the power to the at least one LED and power to the at least one processor based on the varying power-related signal.

25. The apparatus of claim 23, wherein the at least one processor is configured to sample the varying power-related signal and determine at least one varying characteristic of the varying power-related signal.

26. The apparatus of claim 23, wherein the operation of the user interface varies a duty cycle of the power-related signal, and wherein the at least one processor is configured to variably control the at least one parameter of the light based at least on the varying duty cycle of the power-related signal.

27. The apparatus of claim 26, wherein the at least one LED includes a plurality of differently colored LEDs.

28. The apparatus of claim 27, wherein:
the plurality of differently colored LEDs includes:
at least one first LED adapted to output at least first radiation having a first spectrum; and
at least one second LED adapted to output second radiation having a second spectrum different than the first spectrum; and
the at least one processor is configured to independently control at least a first intensity of the first radiation and a second intensity of the second radiation in response to operation of the user interface.

29. The apparatus of claim 28, wherein the at least one processor is programmed to implement a pulse width modulation (PWM) technique to control at least the first intensity of the first radiation and the second intensity of the second radiation.

30. The apparatus of claim 29, wherein the at least one processor further is programmed to:
generate at least a first PWM signal to control the first intensity of the first radiation and a second PWM signal to control the second intensity of the second radiation; and
determine duty cycles of the respective first and second PWM signals based at least in part on variations in the power-related signal due to operation of the user interface.

31. The apparatus of claim 20, wherein the adjustment circuit includes drive circuitry including at least one voltage-to-current converter to provide at least one drive current to the at least one LED so as to control the at least one parameter of the generated light.

32. The apparatus of claim 31, wherein the at least one voltage-to-current converter includes an operational amplifier configured so as to have a predetermined error voltage applied across its non-inverting and inverting inputs during operation to essentially reduce to zero a current output of the at least one voltage-to-current converter when a voltage applied to the at least one voltage-to-current converter is essentially zero.

33. An illumination method, comprising an act of:
A) providing power to at least one LED based on a power-related signal from an alternating current (A.C.) power source that provides signals other than a standard A.C. line voltage.

34. The illumination method of claim 33, wherein the act A) includes an act of:
providing power to the at least one LED based on a power-related signal from an alternating current (A.C.) dimmer circuit.

\* \* \* \* \*